(12) United States Patent
Masuda et al.

(10) Patent No.: US 10,222,534 B2
(45) Date of Patent: Mar. 5, 2019

(54) LIGHT GUIDE PLATE AND VIRTUAL IMAGE DISPLAY DEVICE

(71) Applicant: Sharp Kabushiki Kaisha, Sakai, Osaka (JP)

(72) Inventors: Takeshi Masuda, Sakai (JP); Hiroyuki Furukawa, Sakai (JP); Yoji Noguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/525,749

(22) PCT Filed: Nov. 2, 2015

(86) PCT No.: PCT/JP2015/080899
§ 371 (c)(1),
(2) Date: May 10, 2017

(87) PCT Pub. No.: WO2016/076153
PCT Pub. Date: May 19, 2016

(65) Prior Publication Data
US 2017/0336552 A1 Nov. 23, 2017

(30) Foreign Application Priority Data
Nov. 11, 2014 (JP) .................................. 2014-229284

(51) Int. Cl.
*G02B 27/01* (2006.01)
*F21V 8/00* (2006.01)
*G02B 27/02* (2006.01)

(52) U.S. Cl.
CPC .......... *G02B 6/0036* (2013.01); *G02B 6/0016* (2013.01); *G02B 27/0101* (2013.01); *G02B 27/02* (2013.01)

(58) Field of Classification Search
CPC .. G02B 27/01; G02B 27/0101; G02B 27/017; G02B 27/0172; G02B 27/2235;
(Continued)

(56) References Cited

U.S. PATENT DOCUMENTS 7,205,960 B2 * 4/2007 David ................ G02B 27/0103
345/204
7,656,585 B1 * 2/2010 Powell ..................... G02B 5/09
349/11
(Continued)

FOREIGN PATENT DOCUMENTS

JP 2004-157520 A 6/2004
JP 2007-245393 A 9/2007
(Continued)

*Primary Examiner* — Nicholas R. Pasko
(74) *Attorney, Agent, or Firm* — ScienBiziP, P.C.

(57) ABSTRACT

A light guide plate (30) is configured to allow light output from a display element (10) to be propagated therein and to allow at least a part of the light propagated therein to be reflected by a plurality of reflective structures (34). The plurality of reflective structures each include a reflective surface (36) inclining with respect to a light output surface (S30). The guide plate includes a first transparent member (30A); a second transparent member (30B); and a third transparent member (38) provided between the first transparent member and the second transparent member. The plurality of reflective structures are provided at positions in contact with the third transparent member.

7 Claims, 12 Drawing Sheets

(58) Field of Classification Search
CPC .......... G02B 27/2242; G02B 2027/011; G02B 2027/0112; G02B 2027/0116; G02B 2027/0118; G02B 2027/012; G02B 2027/0123; G02B 2027/013; G02B 6/0011; G02B 6/0013; G02B 6/0015; G02B 6/0016; G02B 6/0018; G02B 6/0025; G02B 6/0033; G02B 6/0035; G02B 6/0036; G02B 6/0038; G02B 6/0051; G02B 6/0053; G02B 6/0055
USPC .................................................. 359/629–633
See application file for complete search history.

(56) References Cited

U.S. PATENT DOCUMENTS

| | | | |
|---|---|---|---|
| 8,189,263 B1 | 5/2012 | Wang et al. | |
| 8,665,178 B1* | 3/2014 | Wang | G02B 27/0172 345/7 |
| 8,965,152 B2* | 2/2015 | Simmonds | G02B 6/0035 359/13 |
| 9,213,178 B1* | 12/2015 | Giri | G02B 27/0081 |
| 9,423,552 B2* | 8/2016 | Richards | G02B 6/0045 |
| 2004/0085649 A1 | 5/2004 | Repetto et al. | |
| 2006/0228073 A1* | 10/2006 | Mukawa | G02B 6/0026 385/31 |
| 2007/0070859 A1* | 3/2007 | Hirayama | G02B 5/32 369/112.04 |
| 2012/0062998 A1* | 3/2012 | Schultz | B29D 11/00663 359/630 |
| 2016/0313557 A1* | 10/2016 | Schmidt | G02B 3/08 |

FOREIGN PATENT DOCUMENTS

| | | |
|---|---|---|
| JP | 2010-282231 A | 12/2010 |
| JP | 2012-198264 A | 10/2012 |
| JP | 2013-98014 A | 5/2013 |
| JP | 2014-99300 A | 10/2014 |

* cited by examiner (a)

(b)

(a)

(b)

(c)

(a)

(b)

(a)

(b)

(c)

(a)

(b)

LIGHT GUIDE PLATE AND VIRTUAL IMAGE DISPLAY DEVICE

TECHNICAL FIELD

The present invention relates to a light guide plate and a virtual image display device including the same.

BACKGROUND ART

Recently, virtual image display devices displaying an image, formed by a small-size display element, in an enlarged state as a virtual image have been progressively developed as head mounted displays or head-up displays. Such a virtual image display device is configured to project light, output by the display element, toward the eye of an viewer by use of a light guide plate, a combiner or the like. A see-through type virtual image display device is capable of displaying a virtual image of the image formed by the display element in a state of overlapping an outside view seen through the light guide plate or the combiner. Use of such a virtual image display device allows an AR (augmented reality) environment to be provided easily.

Patent Document 1 discloses a see-through type virtual image display device displaying a virtual image in a state of overlapping as outside view. This virtual image display device includes an image optical system including a display element, and an optical guide member. Light from the display element is incident on the optical guide member (light guide plate) via a coupling portion located at an end thereof as being collimated. The collimated light incident on the coupling portion is propagated inside the optical guide member, then is reflected by diffraction grating for image extraction, and is output from an light output surface of the light guide member. The diffraction grating for image extraction includes a concaved and convexed inclining surface having a sawtooth-like cross-section and a half-reflective film provided on the inclining surface. The viewer can see the virtual image deep inside the light guide member via the half-reflective film.

Patent Document 2 also discloses a see-through type virtual image display device. The light guide plate used in this virtual image display device includes a substrate having a sawtooth-like surface having a plurality of concaved portions and a relative thin substrate having a surface having a plurality of convexed portions corresponding to the concaved portions. The two substrates are bonded together. At a face where the concaved portions and the convexed portions face each other, a reflective film is provided. In this structure, the reflective film is located in the vicinity of a surface of the light guide plate, so that light propagated inside the light guide plate is reflected toward the viewer.

Patent Document 3 also discloses a virtual image display device including a reflective array reflecting light propagated inside the light guide plate to output the light outside. The reflective array described in Patent Document 3 includes a reflective surface inclining with respect to a light output surface of the light guide plate, a parallel surface parallel to the light output surface, and another inclining surface provided between the reflective surface and the parallel surface.

CITATION LIST

Patent Literature

Patent Document 1: Japanese Laid-Open Patent Publication No. 2004-157520

Patent Document 2: Japanese Laid-Open Patent Publication No. 2012-198264

Patent Document 3: U.S. Pat. No. 8,665,178

SUMMARY OF INVENTION

Technical Problem

In the virtual image display device described in each of Patent Documents 1 and 2, the two substrates stacked to form a light guide plate do not have a uniform thickness, and the reflective film is located in the vicinity of the surface of the light guide plate. In this case, when an impact is applied to the surface of the light guide plate or a stress caused in the light guide plate is increased by heat or the like, damages such as cracks or the like likely to occur to the reflective film. In the structure described in Patent Documents 1 and 2, in which the sawtooth-like surface with the concaved and convexed structure of the main substrate is covered with a relatively thin member, there is a problem that the light guide plate is warped or that the substrates are delaminated in the case where the adhesiveness of the portion having the concaved and convexed structure is low.

In the structure described in Patent Document 3, the two substrates separately formed are bonded to form the light guide plate. In the case where, for example, the materials of the two substrates are not appropriately selected, the light guide plate may be deformed, for example, may be warped, or the reflective film may be cracked. In the structure described in Patent Document 3, the substrates are bonded together such that the convexed portions and the concaved portions are fitted to each other. Therefore, in the case where the positions of the pitches of the convexed portions and the concaved portions are deviated due to the processing precision of the mold or the molding precision, there may be a problem that it is difficult to bond the substrates or that the adhesiveness of the substrates is decreased. Such a problem may significantly decrease the through-out especially for mass-production.

The present invention made in light of the above-described problems has an object of providing a light guide plate that is not easily deformed, for example, warped, or that is not easily broken. The present invention has another object of providing a virtual image display device including such a light guide plate.

Solution to Problem

A light guide plate in an embodiment according to the present invention is configured to allow light output from a display element to be propagated therein and to allow at least a pact of the light propagated therein to be reflected by a plurality of reflective structures. The plurality of reflective structures each includes a reflective surface inclining with respect to a light output surface. The light guide plate includes a first transparent member; a second transparent member, and a third transparent member provided between the first transparent member and the second transparent member. The plurality of reflective structures are provided at positions in contact with the third transparent member.

In an embodiment, one main surface of two main surfaces of the third transparent member is formed so as to include a plurality of inclining surfaces inclining with respect to the light output surface, the plurality of inclining surfaces being fittable with reflective surfaces of the plurality of reflective structures; and the other main surface of the third transparent member is a flat surface parallel to the light output surface.

In an embodiment, the fast transparent member and the second transparent member are each formed of a glass plate or a transparent resin plate, and the third transparent member is formed of a curable resin material applied so as to be in contact with a surface of the first transparent member or the second transparent member.

In an embodiment, a flat portion of the first transparent member and a flat portion of the second transparent member have thicknesses having a ratio in a range of 2:1 to 1:2.

In an embodiment, the first transparent member and the second transparent member have approximately the same coefficient of thermal expansion.

In an embodiment, the first transparent member and the third transparent member have approximately the same coefficient of thermal expansion.

In an embodiment, the first transparent member and the second member are formed by injection molding, and the first transparent member and the second transparent member are located such that gate portions thereof are close to each other in the injection molding.

In an embodiment, the reflective structures include a plurality of concaved or convexed prism structures provided at the first transparent member or the second transparent member, and the third transparent member is provided so as to cover the plurality of prism structures to flatten a surface of the plurality of prism structures.

In an embodiment, one of the first transparent member and the second transparent member at which the plurality of prism structures are provided has a thickness Ha excluding the plurality of prism structures, the other of the first transparent member and the second transparent member has a thickness Hb, and a thickness made by the plurality of concaved or convexed prism structures and the third transparent member on the plurality of concaved or convexed prism structures is h0, Ha−h0≤Hb≤Ha+h0 is fulfilled.

In an embodiment, the plurality of reflective structures include a plurality of concaved or convexed prism structures provided at the third transparent member.

In an embodiment, the third transparent member is in contact with the first transparent member; and the light guide plate further comprises a fourth transparent member provided between the third transparent member and the second transparent member, the fourth transparent member covering the plurality of prism structures to form a surface of the plurality of prism structures.

A virtual image display device is an embodiment according to the present invention includes any of the above-described light guide plates; the display device; and a coupling structure secured to the light guide plate, the coupling structure receiving virtual image projection light output from the display device.

In an embodiment, the virtual image display device is a see-through type virtual image display device configured such feat the reflective surfaces of the plurality of reflective structures reflect a part of the light and transmit a part of the light.

Advantageous Effects of Invention

An embodiment of the present invention provide a light guide plate that has a high shape stability and thus is not easily broken, and a virtual image display device including such a light guide plate.

BRIEF DESCRIPTION OF DRAWINGS

FIG. 1(a) is an isometric view, and FIG. 1(b) is a plan view.

FIG. 2(a) is a side view showing an overall structure, FIG. 2(b) is a cross-sectional view showing an arrangement of prisms in a reflective prism array in a region close to a coupling structure, FIG. 2(c) is a cross-sectional view showing an arrangement of the prisms in the reflective prism array in a region farther from the coupling structure, and FIG. 2(d) is a cross-sectional view showing one prism.

FIG. 6(a) is a cross-sectional view showing a course of light in the coupling structure, FIG. 6(b) is a cross-sectional view showing a course of light in the reflective prism array, and FIG. 6(c) is a cross-sectional view showing a course of light reflected by the prism.

FIG. 7(a) is a cross-sectional view showing a course of light in the coupling structure, and FIG. 7(b) is a cross-sectional view showing a course of light in the prism.

FIG. 8(a) shows the case where a first transparent member and a third transparent member (and a second transparent member) have an equivalent refractive index to each other, and FIG. 8(b) shows the case where the first transparent member and the third transparent member (and the second transparent member) have different refractive indices from each other.

FIG. 9(a) shows a course of light, output in the normal direction, in the vicinity of the coupling structure, and FIG. 9(b) shows a cause of light, output in a direction deviated from the normal direction by the angle of view $\pm\theta_0$, in the vicinity of the coupling structure.

FIG. 10(a) is a cross-sectional view showing oblique vapor deposition, and FIG. 10(b) is an isometric view showing a form in which the semi-reflective film is provided in a predetermined region by use of a mask.

FIG. 11(a) through FIG. 11(d) show different forms.

FIG. 12(a) is a side view showing an overall structure, FIG. 12(b) is a cross-sectional view showing an arrangement of prisms in a reflective prism array in a region close to a coupling structure, FIG. 12(c) is a cross-sectional view allowing an arrangement of the prisms in the reflective prism away in a region farther from the coupling structure, and FIG. 12(d) is a cross-sectional view showing one prism.

FIG. 14(a) is a side view showing an overall structure, FIG. 14(b) is a cross-sectional view showing an arrangement of prisms in a reflective prism array in a region close to a coupling structure, FIG. 14(c) is a cross-sectional view showing an arrangement of the prisms in the reflective prism array in a region farther from the coupling structure, and FIG. 14(d) is a cross-sectional view showing one prism.

DESCRIPTION OF EMBODIMENTS

Figure 1:
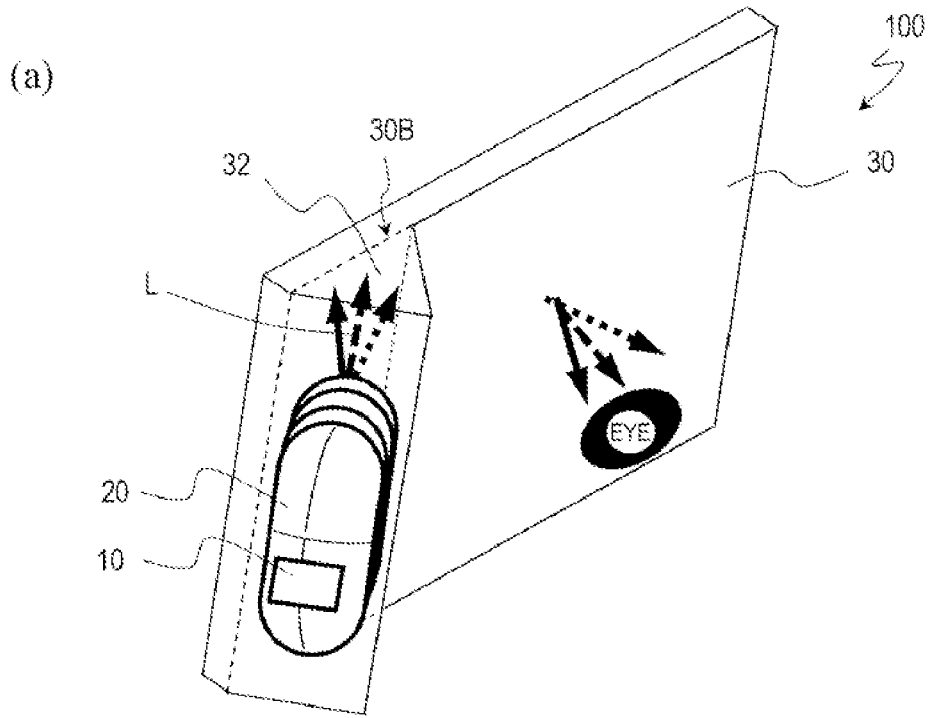
FIG. 1 shows a virtual image display device in embodiment 1 according to the present invention.
Figure 1:
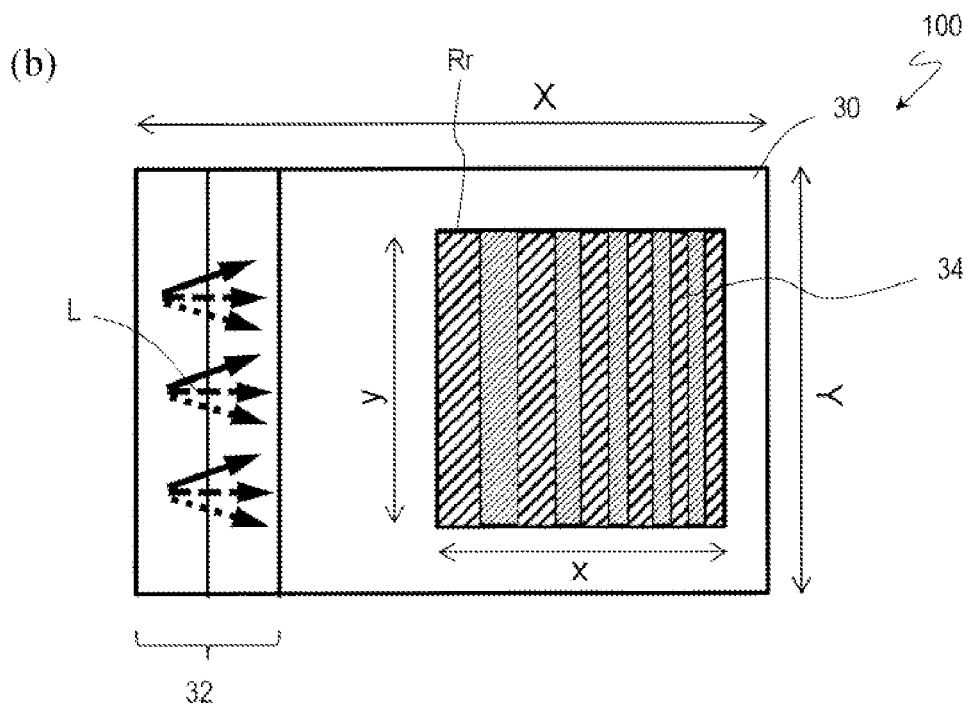

Hereinafter, a light guide plate and a virtual image display device including the light guide plate in an embodiment according to the present invention will be described with reference to the drawings. Hereinafter, a head mounted display (HMD) will be described as an example of virtual image display device, but the present invention is not limited to this. The light guide plate described below is usable for an HMD and also for my other form of virtual image display device such as a head-up display (HUD) or the like.

Embodiment 1

FIG. 1(a) and FIG. 1(b) are respectively an isometric view and a plan view schematically showing a structure of a virtual image display device 100 in embodiment 1. FIG. 2(a) through FIG. 2(d) each schematically show the structure of the virtual image display device 100.

The virtual image display device 100 includes a display element 10 and a projection lens system (collimating optical system) 20 receiving, and then collimating, light output from the display element 10. The virtual image display device 100 also includes a light guide plate 30 projecting light output from the projection lens system 20 toward an viewer.

The light guide plate 30 has a coupling structure 32 receiving light L from the projection lens system 20. The coupling structure 32 is provided on an end portion of one main surface of the light guide plate 30. In this embodiment, the coupling structure 32 is a triangular prism extending along one side of the light guide plate 32 (Y direction shown in FIG. 1(b)). In this specification, an optical element including the light guide plate 30 and the coupling structure 32 may be referred to as a "light guide".

In the above-described structure, the light L output from the display element 10 (virtual image display light L) is collimated by the projection lens system 20 and then is incident on the coupling structure 32 provided on the end portion of the light guide plate 30. The parallel light beams incident on the coupling structure 32 are propagated inside the light guide plate 30 in, for example, X direction shown in FIG. 1(b) from a light receiving portion 31, namely, the portion where the coupling structure 32 is provided (in-plane direction from the coupling structure 32 toward the opposite side of the light guide plate 30).

Figure 2:
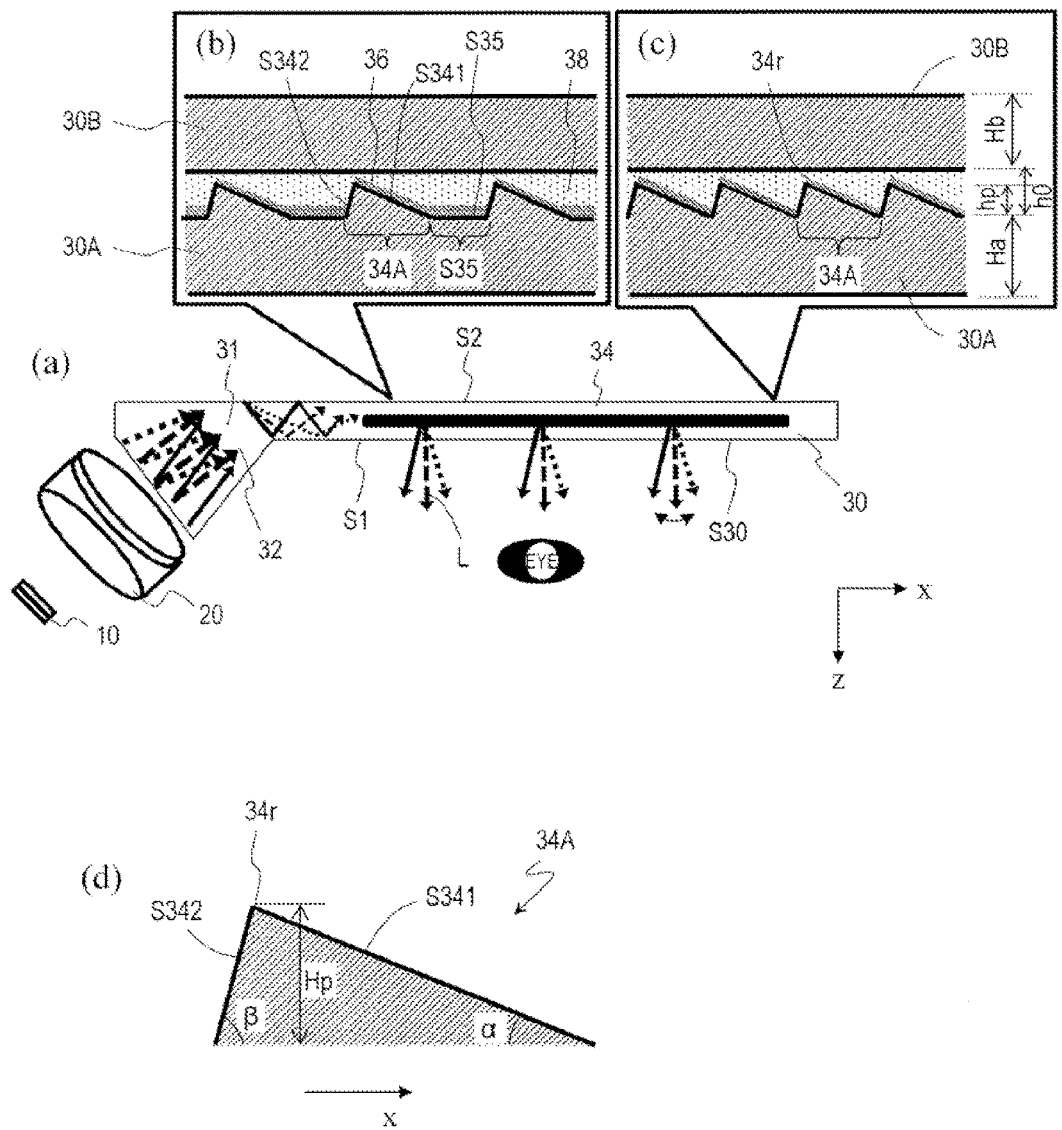
FIG. 2 schematically shows the virtual image display device in embodiment 1.

As shown in FIG. 1 and FIG. 2, the light L introduced form the coupling structure 32 into the light guide plate 30 may include a plurality of light beams that are slightly different from each other in the advancing direction. The light output from a central region of the display element 10 corresponds to a light beam advancing in a direction parallel to the X direction shown in FIG. 1(b). The light output from an end region of the display element 10 corresponds to a light beam advancing in a direction nonparallel to the X direction.

The display element 10 and the projection lens system 20 may each be selected from a wide range of known components. The display element 10 may be, for example, a transparent liquid crystal display panel or a transparent organic EL display panel, and the projection lens system 20 may be, for example, a lens system described in Japanese Laid-Open Patent Publication No. 2004-157520. Alternatively, the display element 10 may be a reflection-type liquid crystal display panel (LCOS), and the projection lens system 20 may be, for example, a concave mirror or a lens group described in Japanese Laid-Open Patent Publication No. 2010-282231. The entirety of Japanese Laid-Open Patent Publication No. 2004-157520 and the entirety of Japanese Laid-Open Patent Publication No. 2010-282231 are incorporated herein by reference. The display element 10 has a diagonal line length of for example, about 0.2 inches to about 0.5 inches. The diameter of the light beam output from the projection lens system 20 may be adjusted by the projection lens system 20. The diameter of the light beam may be increased by adjusting the size of the coupling structure 32.

As shown in FIG. 2(b) and FIG. 2(c), in this embodiment, the light guide plate 30 includes a first transparent member 30A (first transparent substrate) located on the side of the viewer and a second transparent member 30B (second transparent substrate) toasted on the side opposite to the viewer. The first transparent member 30A and the second transparent member 30B are each formed of, for example, a glass plate, a transparent resin plate or the like, and are located to be stacked on each other. The first transparent member 30A and the second transparent member 30B are secured to each other by a third transparent member 38 located therebetween. An outer surface of the first transparent member 30A acts as a bottom main surface S1 (on the side of the viewer) and an outer surface of the second transparent number 30B acts as a top main surface S2 (on the side opposite to the viewer). The bottom main surface S1 and the top main surface S2 of the light guide plate 30 exposed to the air. In the form shown in FIG. 1 and FIG. 2, the coupling structure 32 is located on the bottom main surface S1 of the light guide plates 30, namely, on the outer surface of the first transparent member 30A.

As shown in FIG. 2(a) through FIG. 2(c), a reflective prism array 34 including a plurality of prisms 34A is provided at a middle position in a thickness direction of the light guide plate 30. The reflective prism array 34 is provided in order to reflect the light incident on the light guide plate 30 via the coupling structure 32 and to output the light to the outside of the light guide plate 30. The reflective prism array 34 may be located at any position between an inner surface of the first transparent member 30A and an inner surface of the second transparent member 30B. In this embodiment, the reflective prism array 34 is located at the inner surface of the first transparent member 30A.

As shown in FIG. 1(b), the reflective prism array 34 is located in a predetermined in-plane region in a plane parallel to a light output surface. In this embodiment, the reflective prism array 34 is provided in a predetermined rectangular region Rr having a width x in the X direction of the plane of the light guide plate 30 and having a width y in the Y direction of the plane of the light guide plate 30.

As shown in FIG. 2(*a*), the light incident on the light guide plate 30 via the light receiving portion 31 is reflected by the reflective prism array 34 and is output from a light output surface S30 provided at the bottom main surface S1 of the light guide plate 30 to the outside of the light guide plate 30. The reflective prism array 34 is configured to output the light mainly in a direction normal to the light output surface S30. The direction normal to the light output surface S30 is a direction perpendicular to the X direction and the Y direction (i.e., is Z direction).

In the light guide plate 30, the plurality of prisms 34A formed at the inner surface of the first transparent member 30A are covered with the third transparent member 38. The third transparent member 38 is in contact with the inner surface of the second transparent member 30B. With this structure, one surface of the third transparent member 38 has a shape fittable with the shape of the prisms 34A formed at the first transparent member 30A, and the other surface of the third transparent member 38 is a flat surface parallel to the main surface of the light guide plate 30. The third transparent member 38 is provided in order to fill the convexed and concaved portions of the reflective prism array 34, and is in contact with the second transparent member 30B along the flat surface. A detailed structure of the reflective prism array 34 will be described below.

As shown in FIG. 2(*a*), the light incident on the light guide plate 30 via the light receiving portion 31 located at an end thereof is propagated inside the light guide plate 30 while being totally reflected by the bottom and top main surfaces S1 and S2 of the light guide plate 30. More specifically, light incident on the bottom and top main surfaces S1 and S2 of the light guide plate 30 at an incidence angle that is larger than, or equal to, a critical angle, determined in accordance with the relative refractive index of the light guide plate 30 with respect to an outer medium (in this example, air), is totally reflected by the interface. The light is propagated inside the light guide plate 30 mainly in a first direction (X direction) while being totally reflected in repetition. In this specification, the main surfaces of the light guide plate 30 may be distinguished as the "top main surface S2" and the "bottom man surface S1" as shown in the figures for the sake of convenience, but these names given to the surfaces do not indicate the actual positional relationship between the surfaces in an actual state of use, needless to say.

In a region outer to the region where the reflective prism array 34 is located, the first transparent member 30A and the second transparent member 30B may be in direct contact with each other or may be connected with each other via a portion extended from the third transparent member 38 (thin layer provided outer to the region where the prism array is provided). In the case where the first transparent member 30A and the second transparent member 30B (and the third transparent member 38) have equivalent refractive index to each other, light is prevented from being refracted or totally reflected at the interface between the first transparent member 30A and the second transparent member 30B. It should be noted that a part of the light propagated inside the light guide plate 30 may be reflected at the interface between the first transparent member 30A and the second transparent member 30B.

Now, the detailed structure of the reflective prism array 34 will be described. As shown in FIG. 2(*b*) and FIG. 2(*c*), the reflective prism array 34 includes the plurality of prisms 34A. The prisms 34A each include a first inclining surface S341 inclining at an angle in a predetermined angle range with respect to the light output surface S30 of the light guide plate 30 and a second inclining surface S342 connected with the first inclining surface S341 at a prism ridge 34*r*. In each of the prisms 34A, the first inclining surface S341 is locked further from the light receiving portion 31 than the second inclining surface S342 is.

As shown in FIG. 2(*d*), an angle made by the first inclining surface S341 and a surface parallel to the light output surface S30 (hereinafter, such a surface may be referred to as an "X-Y plane") is labeled as α, and an angle made by the second inclining surface S34" and the X-Y plane is labeled as β. Angle α is, for example, 10° to 45°, and angle β is, for example, 60° to 90°. Now, referring to FIG. 2(*d*), a cross-section of the light guide plate 30 will be described with which a direction from the end at which the light receiving portion 31 is provided toward the opposite end is a positive direction of the X direction. In this cross-section, the first inclining surface S341 is inclined clockwise by a positive value of angle α with respect to the X-Y plane (0°). The second inclining surface S342 is inclined counterclockwise by a positive value of angle β with respect to the X-Y plane (0°).

As shown in FIG. 2(*b*) and FIG. 2(*c*), a half-reflective film 36 is provided on the prism 34A so as to be in contact with the first inclining surface S341 and a parallel surface S35 (described below) and so as to selectively cover the first inclining surface S341 and the parallel surface S35 (namely, so as not to cover the second inclining surface S342). The half-reflective film 36 is formed of, for example, a thin metal film (Ag film, Al film, etc.) or a dielectric film (TiO$_2$ film, etc.), and may reflect at least a part of the light incident thereon, and transmit a part of the light. With this structure, a part of the light propagated inside the light guide plate 30 may be reflected by the first inclining surface S341 and the parallel surface S35, and light incident from the outside of the top main surface S2 of the light guide plate 30 (external light) may be output from the bottom main surface S1 of the light guide plate 30.

As described above, the half-reflective film 36 is provided so as to cover the first inclining surface S341 of the prism 34A and the parallel surface S35 but is not provided on the second inclining surface S342. Namely, the light propagated inside the light guide plate 30 is reflected by the first inclining surface S341 of the prism 34A and the parallel surface S35 but is not reflected by the second inclining surface S342. A reason for this is that if the second inclining surface S342 acts as a reflective surface, the light is reflected in a non-assumed direction to became stray light, which makes it difficult to provide high quality virtual image display.

Figure 3:
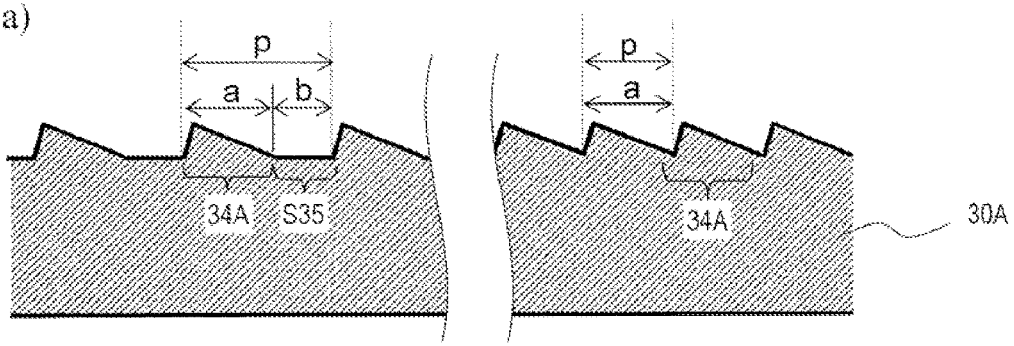
FIG. 3(a) shows an arrangement of the prisms in the region close to the coupling structure and in the region farther from the coupling structure.
FIG. 3(b) shows a change in the prism pitch and the like, and FIG. 3(c) shows the incidence angle (reflection angle) dependence of the transmittance and the reflectance of a semi-reflective film.
Figure 3:
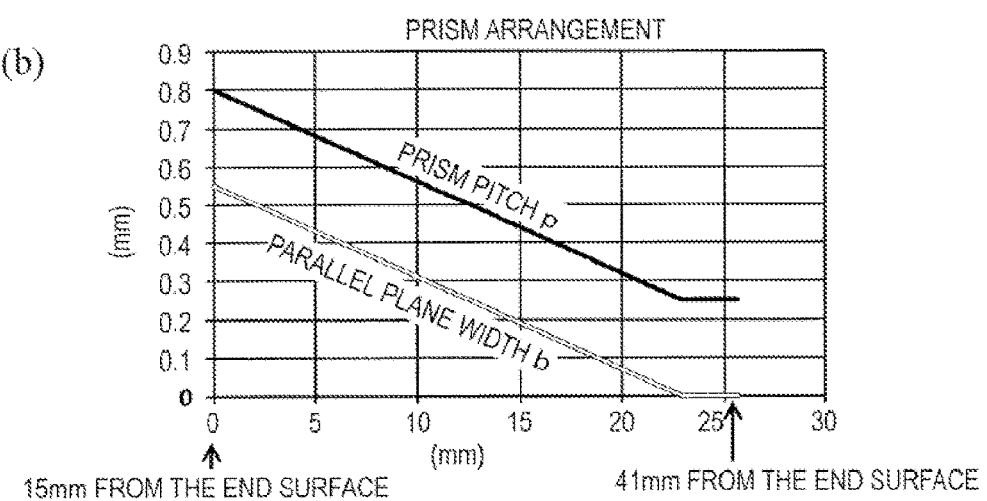
Figure 3:
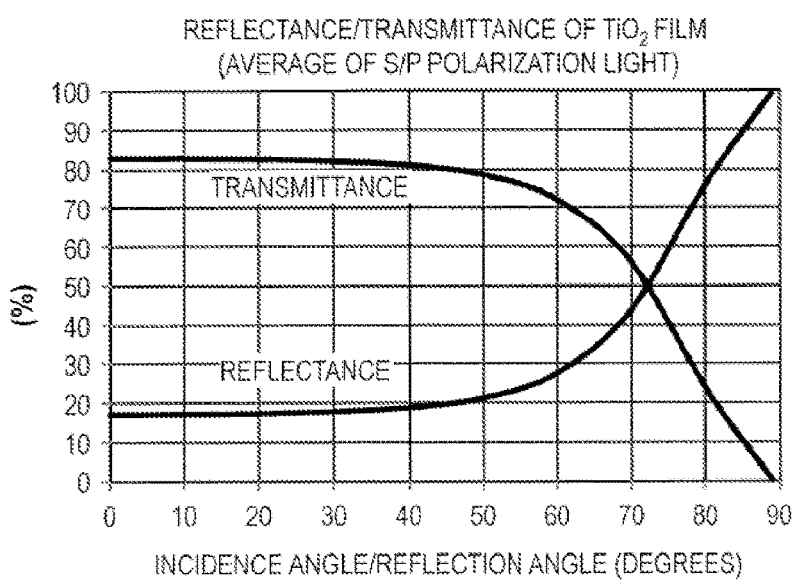

FIG. 3(*c*) shows the incidence angle (reflection angle) dependence of the transmittance and the reflectance of the half-reflective film 36 (in this example, TiO$_2$ film). In this embodiment, light incident approximately vertically at an incidence angle of 0° has a high transmittance and a low reflectance. Light incident approximately horizontally at an incidence angle of 90° has a low transmittance and a high reflectance. Since a TiO$_2$ film is used as the half-reflective film 36, light is not absorbed by the half-reflective film.

As shown in FIG. 2(*b*), the reflective prism array 34 provided in the light guide plate 30 in this embodiment includes a slit-like flat portion (parallel surface S35) between the prisms 34A adjacent to each other in a region close to the coupling structure 32 (or the light receiving portion 31). As shown in FIG. 2(*c*), the above-described flat portion is not provided between the prisms 34A adjacent to each other and the prisms 34A are located continuously and close to each other in a region far from the coupling structure 32 (or the light receiving portion 31).

Now, why the prisms are arranged in different patterns in different regions in the reflective prism array 34 as described above will be described. When the light reflected by the reflective prism array 34 is output from the light guide plate 30, the light may be viewed with different levels of brightness in accordance with the position in the output light S30. One conceivable reason for this is that in the case where the in-plane distribution of the reflective surfaces of the reflective member provided in the light guide plate 30 (in this example, the reflective prism array 34) is uniform, the intensity of the parallel light beams output at a position close to the light receiving portion 31, on which the light from the display element 10 is incident, is high, whereas the intensity of parallel light beams output at a position far from the light receiving portion 31 is low.

For the above-described reason, the reflective prism array 34 in this embodiment adopts a structure in which the area size ratio of the first inclining surfaces S341 with respect to the unit area size in the output surface is varied in accordance with the position in the output surface. More specifically, as shown in FIG. 2(*b*), among the region where the reflective prism array 34 is provided, in a region close to the coupling structure 32 (or the light receiving portion 31 of the light guide plate 30), flat portions (parallel surfaces S35) are provided between the prisms 34A adjacent to each other. As a result, the area size ratio of the first inclining surfaces S341 is relatively low. By contrast, as shown in FIG. 2(*c*), in a region far from the coupling structure 32 (or the light receiving portion 31 of the light guide plate 30), the prisms 34A are located at a higher concentration with no flat portion being provided between the prisms 34A adjacent to each other. As a result, the area size ratio of the first inclining surfaces S341 is relatively high.

FIG. 2(*b*) and FIG. 2(*c*) show the arrangements of the prisms 34A in a region of the reflective prism array 34 that is closest to the coupling structure 32 and in a region of reflective prism array 34 that is farthest from the coupling structure 32. In a region between these regions, parallel surfaces narrower than the parallel surface S35 shown in FIG. 2(*b*) may be located between the prisms 34A adjacent to each other. Namely, as the prisms 34 are farther from the coupling structure 32 or the light receiving portion 31, the interval between the prisms 34A (arrangement pitch) or the width of the parallel surface S35 provided between the prisms 34A may be narrowed gradually or step by step. In the reflective prism array 34, the in-plane density of the prisms 34A (existence ratio per unit area size) may be increased as the prisms 34A are farther from the light receiving portion 31.

FIG. 3(*a*) shows the arrangement of the prism 34A in the region close to the coupling structure 32 and the arrangement of the prism 34A in the region far from the coupling structure 32. In order to allow the virtual image reflection light to be extracted uniformly in the region where the reflective prism array 34 is located, the plurality of prisms 34A formed by molding at the surface of the first transparent member 30A are located such that the ratio of the prisms 34A per unit area size is low in the region close to the coupling structure 32 and becomes higher as the prisms 34A are distanced from the coupling structure 32.

As described above, in order to increase the in-plane density of the prisms, it is conceivable to the prisms are located as follows: where the arrangement pitch of the prisms is p, the width of each prism 34A is a and the width of each parallel surface S35 is b, the parallel surface width b is decreased while the prism width a is kept the same. Alternatively, it is conceivable that the prisms are located such that the prism width a is increased while the prism arrangement pitch p is kept the same. In consideration of the parallel degree of the output surface S30 through which the virtual image light is output from the light guide plate 30, and the surface facing the output surface, it is preferable to keep the prism width a the same because in this manner, it is easier to keep the parallel degree and to bond the second transparent member 30B.

A more specific design is as follows, for example, the prism width a is 0.25 mm. One end of a prism formation region where the prisms are formed has a distance of 15 mm from an end surface of the first transparent member 30A at which the coupling structure 32 is located, and the other end of the prism formation region has a distance of 41 mm from the end surface. Namely, the prism formation region has a width of 26 mm. In such a prism formation region, the prisms may be located such that the parallel surface width b is gradually decreased from 0.55 mm to 0 m. In the case where the prism width is a=0.25 mm, the inclination angle of the first inclining surface is $\alpha=26°$, and the inclination angle of the second inclining surface is $\beta=85°$, the prism height is hp=0.117 mm.

FIG. 3(*b*) shows the prism arrangement pitch p and the width b of the parallel surface S35 with respect to the position of the prism in the above-described case. As shown in FIG. 3(*b*), in the reflective prism array 34, the prism arrangement pitch p and the width b of the parallel surface S35 are large in the region close to the coupling structure 32, and are small in the region far from the coupling structure 32. The prism arrangement pitch p and the width b of the parallel surface S35 are gradually decreased in accordance with the distance from the end of the reflective prism array 34.

Now, the sizes of the first transparent member 30A and the second transparent member 30B and a method for forming the same will be described. The first transparent member 30A and the second transparent member 30B may be both formed by, for example, injection molding. Injection molding is to form a molded product by injecting a molding resin, heated to be fluidable, into a die at a high pressure.

Figure 4:
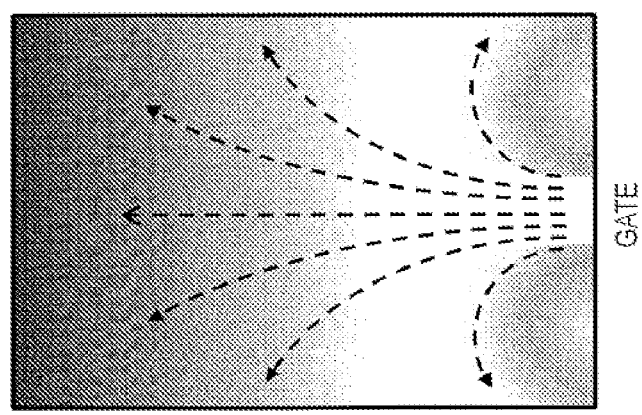
FIG. 4(a) is a plan view showing a flow of a molding material from a gate and a remaining strain in a light guide plate in injection molding.
FIG. 4(b) is a cross-sectional view showing the degree of thermal expansion caused when the two plate-like transparent members have different thicknesses.
Figure 4:
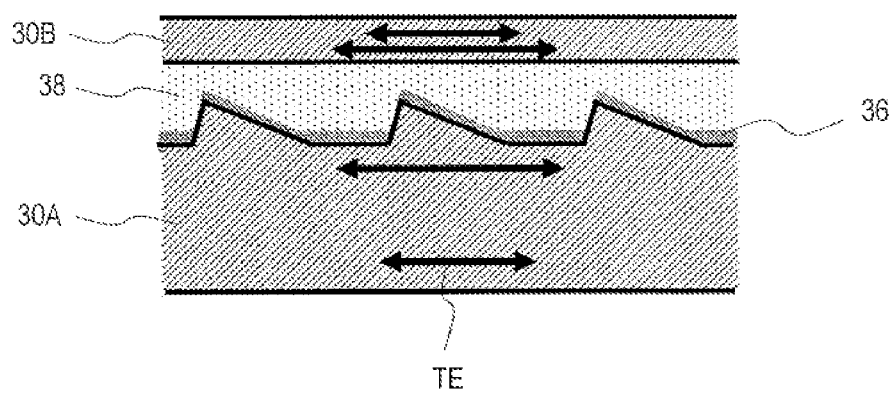

It should be noted that as shown in FIG. 4(*a*), a pressure distribution is caused in the molded member along a flow of a molding material (represented by the dashed lines in FIG. 4(*a*)) from an injection opening (gate), and as a result, a strain (stress) remains in the molded member. Therefore, when two such molded members are bonded together, the coefficients of thermal expansion thereof may be different from each other locally due to the difference in the distribution of the remaining strain even if the coefficients of thermal expansion of the two molded members match each other on average (in general). In this case, the light guide plate 30 is easily warped or deformed when, for example, a thermal load is applied thereto. In addition, the semi-reflective film 36 may be cracked, or one of the members may be delaminated due to the low adhesiveness at a portion where the semi-reflective film 36 is provided.

With the injection molding, the first transparent member 30A and the second transparent member 30B may be formed of the same material, so that the coefficients of thermal expansion thereof match each other on average (in general). However, it is difficult to precisely match the coefficient of thermal expansion of the third transparent member 38, which is formed of a different material, to that of the first and second transparent member 30A and 30B. In this case, as shown in FIG. 4(b), the degree of thermal expansion TE at the surfaces of the light guide plate, namely, the outer surfaces of the first transparent member 30A and the second transparent member 30B, and the degree of thermal expansion TE in portions of the first transparent member 30A an the second transparent member 30B that are in the vicinity of the first transparent member 38, are different from each other. As a result, a thermal stress is caused. In the case where the first transparent member 30A and the second transparent member 30B are different in the thickness, the light guide plate may be warped or deformed due to the difference in the thermal stress between the first transparent member 30A and the second transparent member 30B. In addition, the semi-reflective film 36 may be cracked, or one of the members may be delaminated.

Thus, in this embodiment, the first transparent member 30A and the second transparent member 30B are formed of the same material by injection molding so as to have the same distribution of the remaining strain. In addition, the first transparent member 30A and the second transparent member 30B are formed to have substantially the same thickness, so as to have an equivalent thermal stress when being supplied with a thermal load. It is possible to integrally form the coupling structure 32 with the first transparent member 30A by molding. However, in the case where the coupling structure 32 is formed separately, the remaining strains caused to the first transparent member 30A and the second transparent member 30B are matched to each other more easily.

Figure 5:
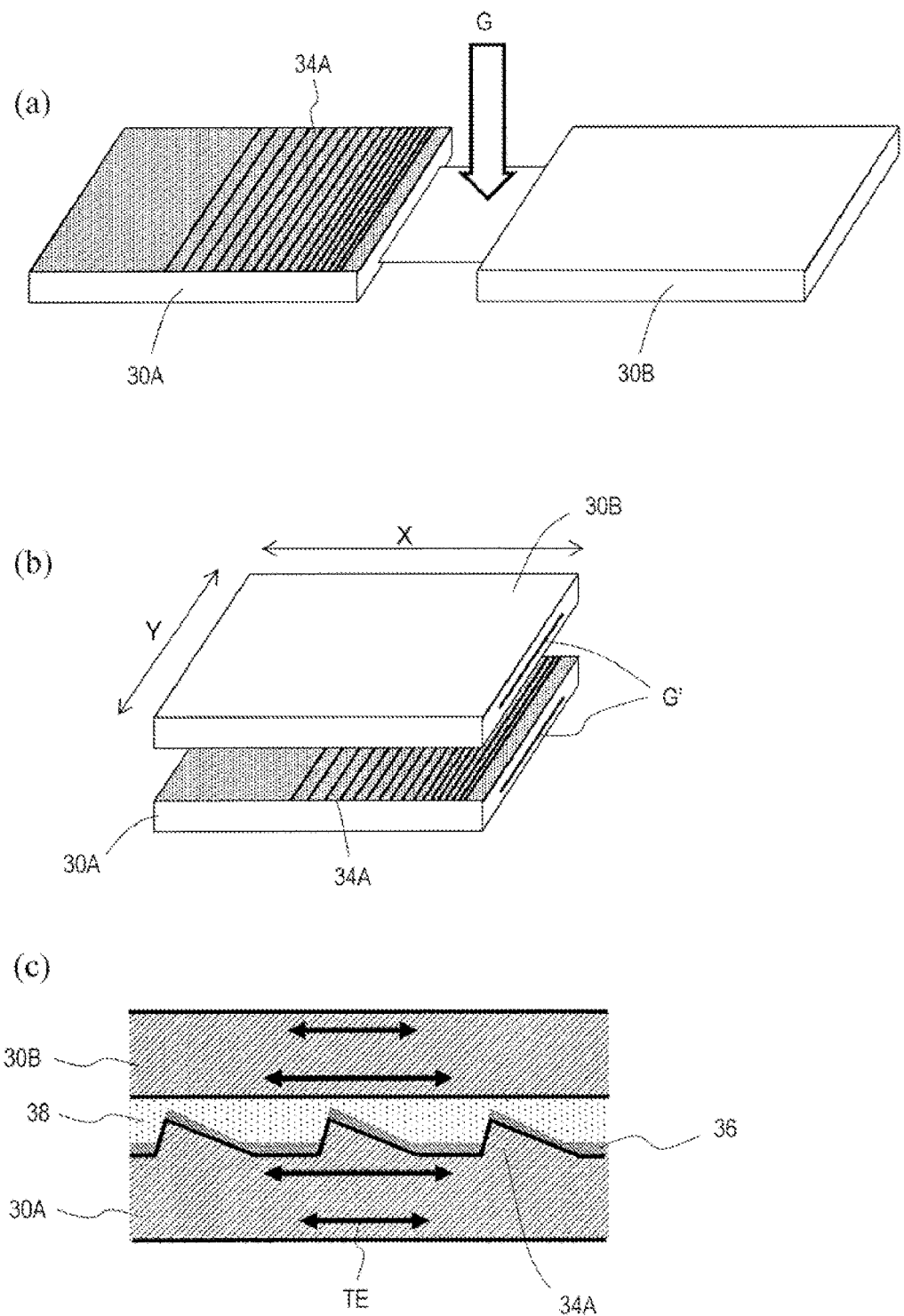
FIG. 5(a) is an isometric view showing a gate when the two plate-like transparent members are produced at the same time by injection molding.
FIG. 5(b) is an isometric view showing that the two transparent members are stacked on each other such that gate portions thereof are close to each other.
FIG. 5(c) is a cross-sectional view showing the degree of thermal expansion caused in each of the transparent members.

FIG. 5(a) through FIG. 5(c) show steps of forming the first transparent member 30A and the second transparent member 30B at the same time by injection molding. As shown in FIG. 5(a), the first transparent member 30A and the second transparent member 30B are molded at the same time in the same molding die. As shown in FIG. 5(a), a gate G (resin injection opening in the molding die) is provided between the first transparent member 30A and the second transparent member 30B.

The first and second transparent members 30A and 30B may have an external size set to, for example, X=45 mm and Y=30 mm. Regarding the thickness thereof, as shown in FIG. 2(c), the first transparent member 30A, at which the prisms 34A are formed, may have a thickness Ha of 1.0 mm excluding the thickness of the prisms, and the flat plate-like second transparent member 30B may have a thickness Hb of 1.0 mm. The shape of the prisms 34A formed at the surface of the fast transparent member 30A will be described below. The prisms 34A have a height hp (distance from the bottom surface to the apex) set to, for example, 0.117 mm. Desirably, the prism height hp is sufficiently smaller than the thickness Ha of the first transparent member 30A. The thickness Ha of the flat portion of the first transparent member 30A and the thickness Hb of the second transparent member 30B may each be, for example, 0.5 mm or greater and 2 mm or less.

The first transparent member 30A and the second transparent member 30B are secured to each other by the third transparent member 38 located therebetween so as to cover the prisms 34A of the first transparent member 30A. Thickness h0 made by the prisms 34A of the first transparent member 30A and the third transparent member 38 on the prisms 34A (namely, distance from bottoms surfaces of the prisms 34A to the second transparent member 30B) is set to, for example, 0.13 mm.

The thickness Ha of the flat portion of the first transparent member 30A, at which the prisms are provided, and the thickness Hb of the flat plate-like second transparent member 30B facing the first transparent member 30A, may have a ratio set to, for example, 2:1 to 1:2. In this manner, the thickness of the first transparent member 30A and the thickness of the second transparent member 30B are set so as not to be significantly different from each other, so that the light guide plate is not easily warped or the members are not easily delaminated.

Alternatively, it is desirable that the thickness Hb of the second transparent member 30B is set to fulfill Ha−h0≤Hb≤Ha+h0. In this case, the thickness Hb of the second transparent member 30B is approximately the same as the average thickness of the first transparent member 30A. In the case where the planar sizes of the first transparent member 30A and the second transparent member 30B are equivalent to each other, the volumes thereof approximately match each other. The expression Ha−h0≤Hb≤Ha+h0 may be modified to derive the expression Hb−h0≤Ha≤Hb+h0.

In the case where the first transparent member 30A and the second transparent member 30B are formed at the same time in the same molding die as described above, the molding die may be filled with the resin from the gate G by symmetrical flows. Therefore, the remaining strain may be distributed symmetrically with respect to the gate G located therebetween. As shown in FIG. 5(b), the first transparent member 30A and the second transparent member 30B may be stacked on each other such that portions G' (gate portions) thereof located on the side of the gate G are aligned with each other, namely, such that the gate portion G' and the first transparent member 30A and the gate portion G' of the second transparent member 30B are close to each other. In this manner, the in-plane distributions of the remaining stain of the first transparent member 30A and the second transparent member 30B are matched to each other. Therefore, as shown in FIG. 5(c), even, if a thermal stress is applied after the first transparent member 30A and the second transparent member 30B are bonded together while having the third transparent member 38 (e.g., ultraviolet-curable ran) therebetween, the thermal expansion TE is caused equivalency in the first transparent member 30A and in the second transparent member 30B. This prevents different thermal stresses from being caused locally. This suppresses deformation, such as warping or the like, of the light guide plate 30 or delamination of the members. Even in the case where an impact or a stress is applied to the surface of the light guide plate 30, cracking or delamination is prevented because the second transparent member 30B is sufficiently thick and the semi-reflective film 36 is not located in the vicinity of the surface of the light guide plate 30. It should be noted that the first transparent member 30A and the second transparent member 30B do not need to be formed of the same material. The warping or defamation of the light guide plate by the thermal stress may be prevented as long as the materials of first transparent member 30A and the second transparent member 30B have approximately the same coefficient of thermal expansion. Thus, the light guide plate is not limited to being produced by the above-described method of molding the first transparent member 30A and the second transparent member 30B integrally.

Figure 6:
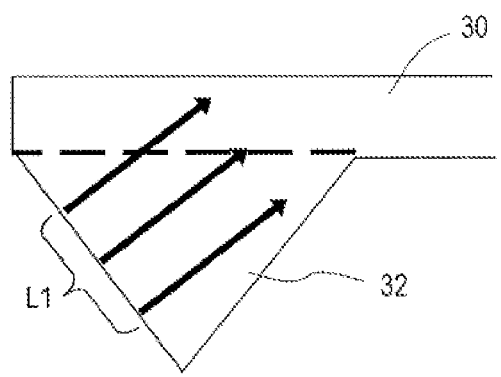
FIG. 6 shows courses of virtual image projection light in the virtual image display device in embodiment 1.
Figure 6:
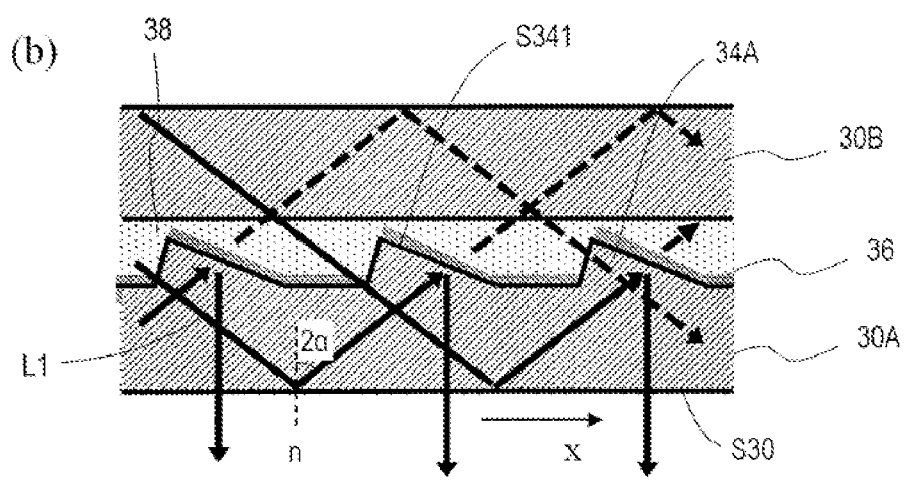
Figure 6:
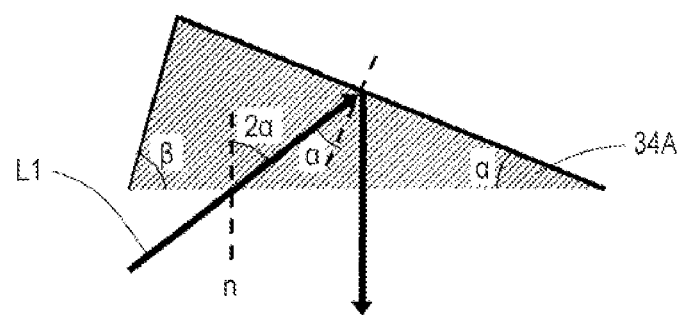
Figure 7:
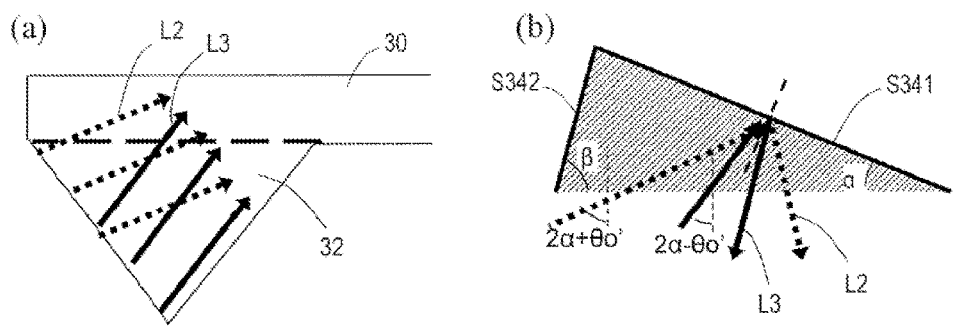
FIG. 7 shows courses of light to be output while being deviated from normal direction by the angle of view $\pm\theta_0$.

Now, with reference to FIG. 6(a) through FIG. 6(c), the inclination angle α of the first inclining surface S341 of the prism 34A provided in the light guide plate 30 will be described. As shown in FIG. 6(a), a light component L1 output from the central region of the display element 10 (see FIG. 1(a) and FIG. 2(a)) enters the light guide plate 30 via the coupling structure 32. The light output from the end region of the display element 10 is also incident on the light guide plate 30 via the coupling structure 32. However, as shown in FIG. 7(a), such light components L2 and L3 are incident in the coupling structure 32 at an angle different from the incidence angle of the light component L1 from the central region. Firm, with reference to FIG. 6(a) through FIG. 6(c), a course of the virtual image projection light component L1 from pixels in the central region of the display element 10 will be described.

As shown in FIG. 6(b), the light component L1 incident on the light guide plate 30 and advancing mainly in the X direction while being totally reflected in repetition is reflected by the inclining surface S341 of the prism 34A. The reflected light is typically output in a normal direction n to the light output surface S30 of the light guide plate 30.

In the case where the light component L1 is output in the normal direction n to the light output surface S30, the light component L1 is incident at an incidence angle $\alpha$ with respect to the first inclining surface S341 of the prism 34A (angle same as the inclination angle $\alpha$ of the first inclining surface S341). As shown in FIG. 6(c), the light incident at the incidence angle $\alpha$ advances inside the light guide plate 30 in a direction different by merely angle $2\alpha$ from the normal direction n. As shown in FIG. 6(b), this light is totally reflected by the bottom surface of the light guide plate 30. Therefore, in order to allow the light to reach the first inclining surface S341 after being totally reflected inside the light guide plate 30 in repetition and to be reflected and output in the normal direction n, the condition of $\theta c \leq \alpha < 90°$ needs to be fulfilled. $\theta c$ represents the critical angle of the light guide plate 30, and the light incident on the top surface and the bottom surface of the light guide plate 30 at an incidence angle of the critical angle $\theta c$ or greater is totally reflected. From the above, it is preferable that the inclination angle $\alpha$ of the first inclining surface of the prism is set to fulfill $\theta c/2 \leq \alpha < 45°$.

As shown in FIG. 7(a) and FIG. 7(b), in the virtual image display device 100, the light may be output at an angle in the range of the angle of view ($\pm \theta_0$) in the horizontal direction (propagation direction of the virtual image projection light in the light guide plate; X direction described above) (namely, the light may be output at an angle in the range of $\pm \theta_0$ with respect to the normal direction n (0°)). Where the incidence angle (refraction angle), on the light guide plate side, of the light components L2 and L3, output from the light output surface at an angle of $\pm \theta_0$, is $\pm \theta_0'$, as shown in FIG. 7(b), the light components L2 and L3 advance inside the light guide plate 30 in a direction different merely by $2\alpha \pm \theta_0'$ from the normal direction n and are reflected by a reflective surface having the inclination angle $\alpha$. Therefore, similar to the above, in order to allow the light, propagated inside the light guide plate 30 and reflected by the inclination surface having the inclination angle $\alpha$, to be output at an angle of view of $\pm \theta_0$, it is preferable that $\theta c \leq \alpha \pm \theta_0' < 90°$ is fulfilled. Namely, in the case where $\theta c + \theta_0' \leq 2\alpha < 90 - \theta_0'$ is fulfilled, the virtual image projection light components L2 and L3 are output appropriately in the direction having the angle of view of $\pm \theta_0$.

Where the direction to which the display light output from the central region of the display element 10 is collimated is a central direction, the direction to which the display light output from pixels at ends of the display region (top end, bottom end, left end and right end) is collimated has a predetermined angle with respect to the central direction. The light output in the direction deviated from the direction normal to the light output surface as shown in FIG. 7(a) and FIG. 7(b) may be, for example, light output from the pixels at the ends of the display element 10.

Figure 8:
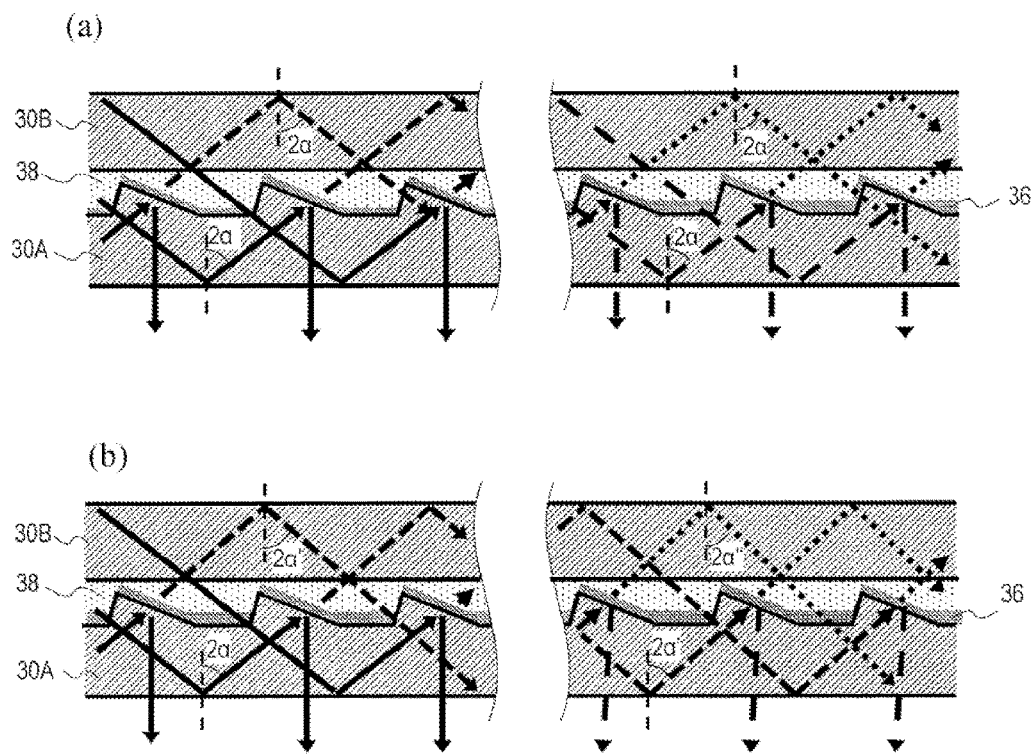
FIG. 8 provides cross-sectional views showing courses of light in the reflective prism array.

FIG. 8(a) and FIG. 8(b) respectively show a course of light in the case where refractive index n1 of the first transparent member 30A including the bottom main surface S1 of the light guide plate 30, refractive index n3 of the third transparent member 38 covering the prisms 34A, and refractive index n2 of the second transparent member 30B including the top main surface S2 of the light guide plate 30 approximately match each other, and a course of light in the case where the refractive indices do not match each otter.

As shown in FIG. 8(a), in the case where the refractive index of the first transparent member 30A, at which the prisms 34A are formed, and the refractive index of the third transparent member 38 approximately match each other and these refractive indices and the refractive index of the second transparent member 30B approximately match each other, the light introduced to the light guide plate 30 via the coupling structure 32 is propagated inside the light guide plate 30 while being totally reflected in repetition while keeping the reflection angle $2\alpha$.

In this case, a past of the light is transmitted through the semi-reflective film 36 provided on the first inclining surface S341 and enters the third transparent member 38 and the second transparent member 30B. It should be noted that the light is reflected by the outer surface of the second transparent member 30B (top main surface S2 of the light guide plate 30) while keeping the reflection angle $2\alpha$. Therefore, like the light reflected without being transmitted through the semi-reflective film 36, the light incident on the third transparent member 38 and the second transparent member 30B may be reflected by the first inclining surface S341 having the inclination angle $\alpha$, while being propagated inside the light guide plate 30, and may be output from the light guide plate 30 in the normal direction n to the light output surface S30.

As shown in FIG. 8(b), in the case where the refractive index of the first transparent member 30A, at which the prisms 34A are formed, does not match the refractive index of the third transparent member 38 covering the prisms 34A or the refractive index of the second transparent member 30B, the light transmitted through the semi-reflective film 36 is refracted at an angle in accordance with the relative refractive index of the first transparent member 30A and the third transparent member 38 (or the second transparent member 30B). Therefore, the light transmitted through the semi-reflective film 36 is propagated inside the light guide plate 30 while being reflected at a different reflection angle $2\alpha'$ without keeping the reflection angle $2\alpha$. For this reason, unlike the light reflected without being transmitted through the semi-reflective film 36, the light transmitted through the semi-reflective film 36 may be output in a direction deviated from the normal direction n to the light output surface S30. Light transmitted through the semi-reflective film 36 a plurality of times is further propagated inside the light guide plate 30 while being reflected at another different reflection angle $2\alpha'$, and therefore, may be output from a direction further deviated from the normal direction n to the light output surface S30. As described above, the output angle is varied each time the light is transmitted through the semi-reflective film 36. As a result, there may occur a problem that the virtual image is viewed as being blurred and thus the display quality is decreased. As can be seen from the above, as long as the refractive index n1 of the first transparent member 30A, at which the prisms 34A are formed, the refractive index n3 of the third transparent member 38 covering the prisms 34A, and the refractive index n2 of the second transparent member 30B facing the first transparent member 30A with the third transparent member 38 being therebetween are matched to each other, the display quality is improved.

Now, with reference to FIG. 9(a) and FIG. 9(b), the shape of the coupling structure 32 will be described.

As described above, in this embodiment, to coupling structure 32 has a triangular prism shape, and includes a lengthy rectangular inclining surface (light receiving surface) S32 inclining with respect to the light output surface S30. Light from the display element 10 is incident on the inclining surface S32 alter being collimated by the projection lens system 20.

Figure 9:
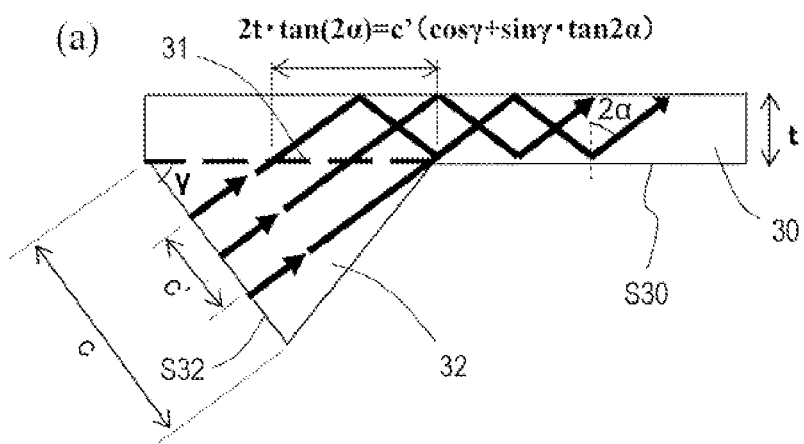
FIG. 9 provides cross-sectional views showing courses of light incident on the coupling structure.
Figure 9:
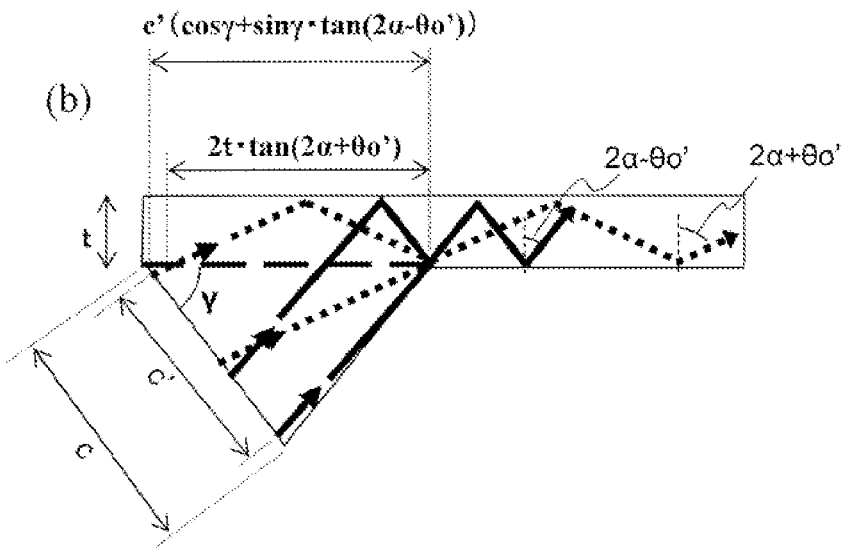

The condition under which the light output from to central region of the display element 10 and introduced into the light guide plate 30 via to coupling structure 32 reaches to entirety of to reflective prism array 34 (see FIG. 3, etc.) uniformly is as follows: as shown in FIG. 9(a), a light component having a width of $2t \cdot \tan 2\alpha$ or greater in the horizontal direction is incident on the light receiving portion 31. Herein, t is the thickness of the light guide plate 30. In the case where a narrower light component is introduced, there may be a region in the light guide plate 30 where the light is not propagated. In addition, the light may reach the reflective prism away 34 only locally. In this case, the reflected light may not be obtained with in-plane uniformity.

Where the width of each of parallel light beams at the light receiving surface S32 of the coupling structure 32 is c', light having the width c' has a width of $c'(\cos(\ )+\sin(\ )\tan(2\alpha))$ in the horizontal direction on the light receiving portion S31 of the light guide plate 30. Herein, is an angle made by the light receiving surface S32 of the coupling structure 32 and the bottom surface of the light guide plate. In this case, it is desirable that $c'(\cos(\ )+\sin(\ )\tan(2\alpha))$ is $2t \cdot \tan 2\alpha$ or greater in order to allow the reflected light to be easily obtained with in-plane uniformity.

In this case, regarding the width c of the light receiving surface S32 of the coupling structure 32, it is desirable that the width $c(\cos(\ )+\sin(\ )\tan(2\alpha))$ of the light receiving surface S32 in the horizontal direction is $2t \cdot \tan 2\alpha$ or greater. Namely, it is preferable that $c(\cos(\ )+\sin(\ )\tan(2\alpha)) \geq 2t \cdot \tan 2\alpha$ is fulfilled. In the case where this conditions is fulfilled, the coupling structure 32 receives parallel light beams having the sufficient, width c' appropriately and guides the parallel light beams to the entirety of the reflective prism array 34 without inhibiting the advancement of the parallel light beams.

The shape and the size of the coupling structure may be appropriately selected, so that the virtual image display light is uniformly reflected by the reflective prism array 34. This suppresses the virtual image light extracted from the light guide plate 30 from being non-uniform and thus realizes display of a high quality virtual image.

In the case where the angle of view ($\pm\theta_0$) of the virtual image in the horizontal direction is considered as shown in FIG. 9(b), it is preferable that the width c and an inclination angle of the light receiving surface S32 fulfill the condition of $c(\cos(\ )+\sin(\ )\tan(2\alpha-\theta_0')) \geq 2t \cdot \tan(2\alpha+\theta')$ is fulfilled by use of the above-described refraction angle $\pm\theta_0'$. In this case, the virtual image light extracted from the light guide plate 30 is suppressed from being non-uniform and thus display of a high quality virtual image is realized.

The width c of the light receiving surface S32 of the coupling structure 32 described above is defined in a direction perpendicular to an intersection line of the light receiving surface S32 and the light output surface S30 (X-Y plane), and is a size of the light receiving surface S32 defined in a direction having an angle with respect to an X-Z plane (cross-section).

Now, a method for producing the virtual image display device 100 in this embodiment will be described. As shown in FIG. 2(a) and the like, the virtual image display device 100 includes the display element 10, the projection lens system 20 and the light guide plate 30. The virtual image display device 100 is produced by appropriately locating these components. The display element 10 and the projection lens system 20 may each be selected from any of various components as described above. The display element 10, the projection lens system 20 and the light guide plate 30 merely need to be located appropriately for the use thereof by a known method, and the manner of locating these will not be described in detail herein. Hereinafter, step of producing the light guide plate 30 and the coupling structure 32 will be described in detail.

The light guide plate 30 is produced as follows. First, as described above with reference to FIG. 5(a) through FIG. 5(c), the first transparent member 30A and the second transparent member 30B are formed at the same time by injection molding. An appropriate molding die may be used, so that the prism array is formed at the surface of the first transparent member 30A. As in another embodiment described below, the first transparent member 30A and the second transparent member 30B may be formed by press molding, and the prism array may be formed by first forming a plate member and then cutting the plate member.

The first transparent member 30A and the second transparent member 30B may be formed of, for example, "Zeonex" produced by Zeon Corporation. In this case, the first transparent member 30A and the second transparent member 30B each have a refection index of 1.535 and a coefficient of thermal expansion of 60 ppm/° C. The first transparent member 30A and the second transparent member 30B may be formed of another material, for example, a transparent resin material represented by an acrylic resin or polycarbonate.

Figure 10:
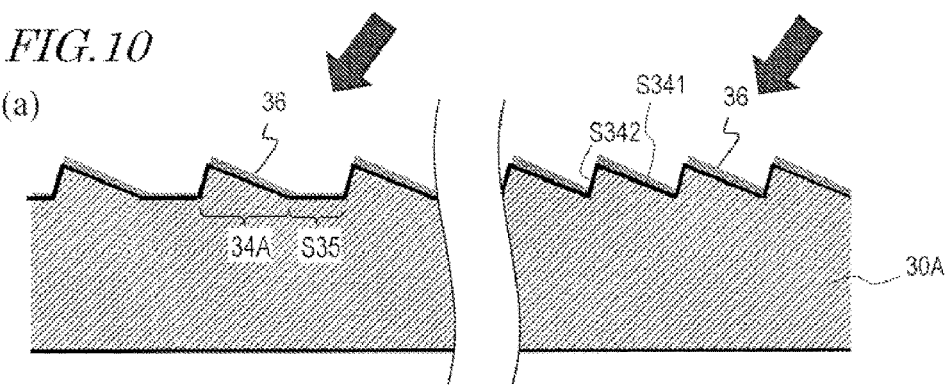
FIG. 10 shows steps of forming a semi-reflective film on the reflective prism array.
Figure 10:
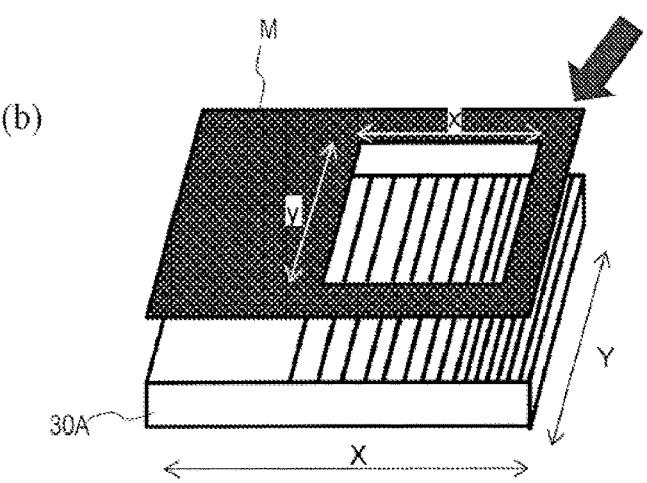

With reference to FIG. 10(a) and FIG. 10(b), a step of forming to semi-reflective film 36 on the surface of the first transparent member 30A, at which the prisms 34A are formed, will be described.

As shown in FIG. 10(a), it is preferable that to semi-reflective film 36 is provided on to first inclining surface S341 of the prism 34A (and on the parallel surface S35) but is not provided on the second inclining surface S342. Therefore, in this embodiment the semi-reflective film 36 is formed on the first inclining surface S341 and the parallel surface S35 by a deposition method providing anisotropy such as oblique vapor deposition or the like. In this embodiment, to semi-reflective film 36 is formed of, for example, a $TiO_2$ film having a thickness of about 65 nm. The semi-reflective film 36 is not limited to being formed of the above film, and may be formed of another dielectric material or a metal material (Al, Ag, etc.). With oblique vapor deposition, vapor deposition is not performed in a direction normal to the first transparent member 30A, but in an oblique direction facing the first inclining surface S341 and not facing the second inclining surface S342 (for example, in a direction normal to the first inclining surface S341).

As shown in FIG. 10(b), the semi-reflective film 36 may be formed by, for example, vapor deposition by use of a mask M, so as to be provided only in a rectangular region having a value of width x and a value of width y that are smaller than those of the external size of the transparent members (e.g., rectangular region in which x=26 mm and y=20 mm). The rectangular region having such values of width x and width y is the region where a prism array is provided. The reflective prism array 34 is formed in this region. The semi-reflective film 36 may be formed on the entirety of the first transparent member 30A with no use of the mask M. In this case, it is preferable that no prism array is formed in a region other than the region where the reflective prism array 34 is to be formed.

In this embodiment, the reflective prism array 34 includes convexed prisms provided at the inner surface of the first transparent member 30A. Alternatively, the reflective prism array 34 may include concaved prisms provided at the inner surface of the first transparent member 30A or the second transparent member 30B. In this case also, the reflective prism array 34 may be formed in substantially the same method as described above. A structure in which such concaved prisms are provided will be scribed below in embodiment 2.

After the above-described step, the third transparent member 38 is formed on the prism array having the semi-reflective film 36 provided thereon as described above. The third transparent number 38 may be formed of a photocurable (ultraviolet-curable) resin, a thermosetting resin, a two-liquid epoxy resin or the like. In this embodiment, an ultraviolet-curable resin, more specifically, "UV-4000" produced by Daikin Industries, Ltd. is used. In this case, the third transparent member 38 has a refractive index of 1.541 and a coefficient of thermal expansion of 109 ppm/° C.

In the case where "Zeonex" is used as the material of the first transparent member 30A and the second transparent member 30B and "UV-4000" is used as the material of the third transparent member 38, the refractive index of each of the first transparent member 30A and the second transparent member 30B and the refractive index of the third transparent member 38 are respectively 1.535 and 1.541, which may be considered to be approximately equivalent to each other. Therefore, the variance in the output angle caused by the refraction of light at the interface is suppressed. In addition, the outside view is avoided from being seen double or triple as a result of external light being refracted at the interface.

The third transparent member 38 is framed as follows. The above-described ultraviolet-curable resin is provided so as to cover the surface of the prisms 34A of the first transparent member 30A. Then, as shown in FIG. 5(b), the second transparent member 30B is located such that the gate portions G' of the first transparent member 30A and the second transparent member 30B are aligned with each other. In the state where the first transparent member 30A and the second transparent member 30B are pressurized while having the above-described resin material therebetween, the resin is polymerized and cured. Thus, the third transparent member 38 is formed.

With such a production method, the surface of the prisms 34A of the first transparent member 30A is flattened in a simple manner to produce the light guide plate including the reflective prism array 34. Therefore, a high productivity is guaranteed. In addition, the first transparent member 30A and the second transparent member 30B are secured to each other by the third transparent member 38 provided therebetween. Therefore, the adhesiveness is increased, and the light guide plate 30 is not easily cracked or warped.

Hereinafter, with reference to FIG. 11(a) through FIG. 11(d), various modification examples of the coupling structure 32 provided at the end of the light guide plate 30 will be described.

In the virtual image display device 100, the triangular prism-shaped member located so as to be in contact with the projection lens system 20 is used as the coupling structure 32. The coupling structure 32 may be in another form. For example, as shown in FIG. 11(a), a coupling structure 32a in another form may include a triangular prism-shaped transparent member provided on the side opposite to the projection lens system 20 (on the top surface of the light guide plate 30) and a reflective film provided on an inclining surface of the transparent member.

Figure 11:
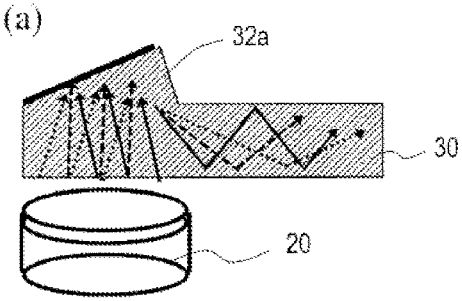
FIG. 11 shows various forms of the coupling structure.
Figure 11:
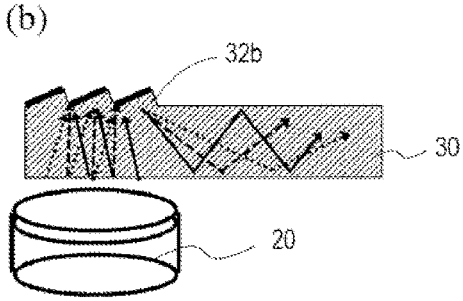
Figure 11:
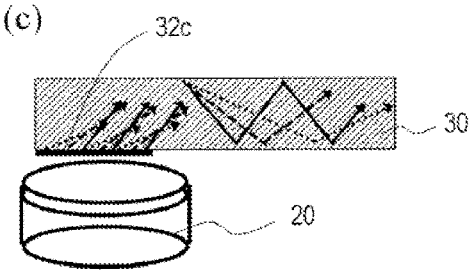
Figure 11:
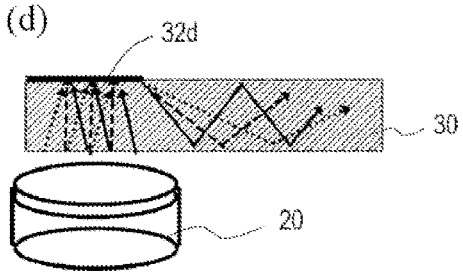

As shown in FIG. 11(b), a coupling structure 32b may have a structure obtained as a result of the coupling structure 32a shown in FIG. 11(a) being divided. More specifically, triangular prism-shaped members each having an inclining surface (reflective surface) are arrayed side by side. As shown in FIG. 11(c), a coupling structure 32c may be formed of hologram diffraction grating located so as to be in contact with the projection lens system 20 at the bottom surface of the light guide plate 30. As shown in FIG. 11(d), a coupling structure 32d may be formed of hologram diffraction grating located at the top surface of the light guide plate 30.

Embodiment 2

FIG. 12(a) through FIG. 12(d) are each a cross-sectional view showing a structure of a virtual image display device 200 in embodiment 2. The virtual image display device 200 in this embodiment 2 is different from the virtual image display device 100 in embodiment 1 on the following point. In the virtual image display device 200, as shown in FIG. 12(b) and FIG. 12(c), among the first and second transparent members 30A and 30B included in the light guide plate 30, the second transparent member 30B located opposite to the viewer has a plurality of concaved prisms 34A (FIG. 12(d)) provided at the inner surface thereof. In the virtual image display device 200, the reflective prism array 34 is provided at the inner surface of the second transparent member 30B.

In the virtual image display device 200, the third transparent member 38 is provided so as to fill the plurality of concaved prisms 34A provided at the second transparent member 30B. A bottom surface of the third transparent member 38 is in contact with the inner surface of the first transparent member 30A. In this embodiment, an interface between the third transparent member 38 and the first transparent member 30A is a flat surface parallel to the light output surface S30.

In the virtual image display device 200, substantially the same components as those of the virtual image display device 100 in embodiment 1 will bear the same reference signs, and detailed descriptions thereof may be omitted.

In this embodiment, the first transparent member 30A and the second transparent member 30B are formed by thermal press molding performed on an acrylic cast plate. "Thermal press molding" is a molding method of pressing a molding die, heated to a high temperature, into a thermoplastic resin such as an acrylic resin or the like to transfer the shape of the molding die.

Figure 12:
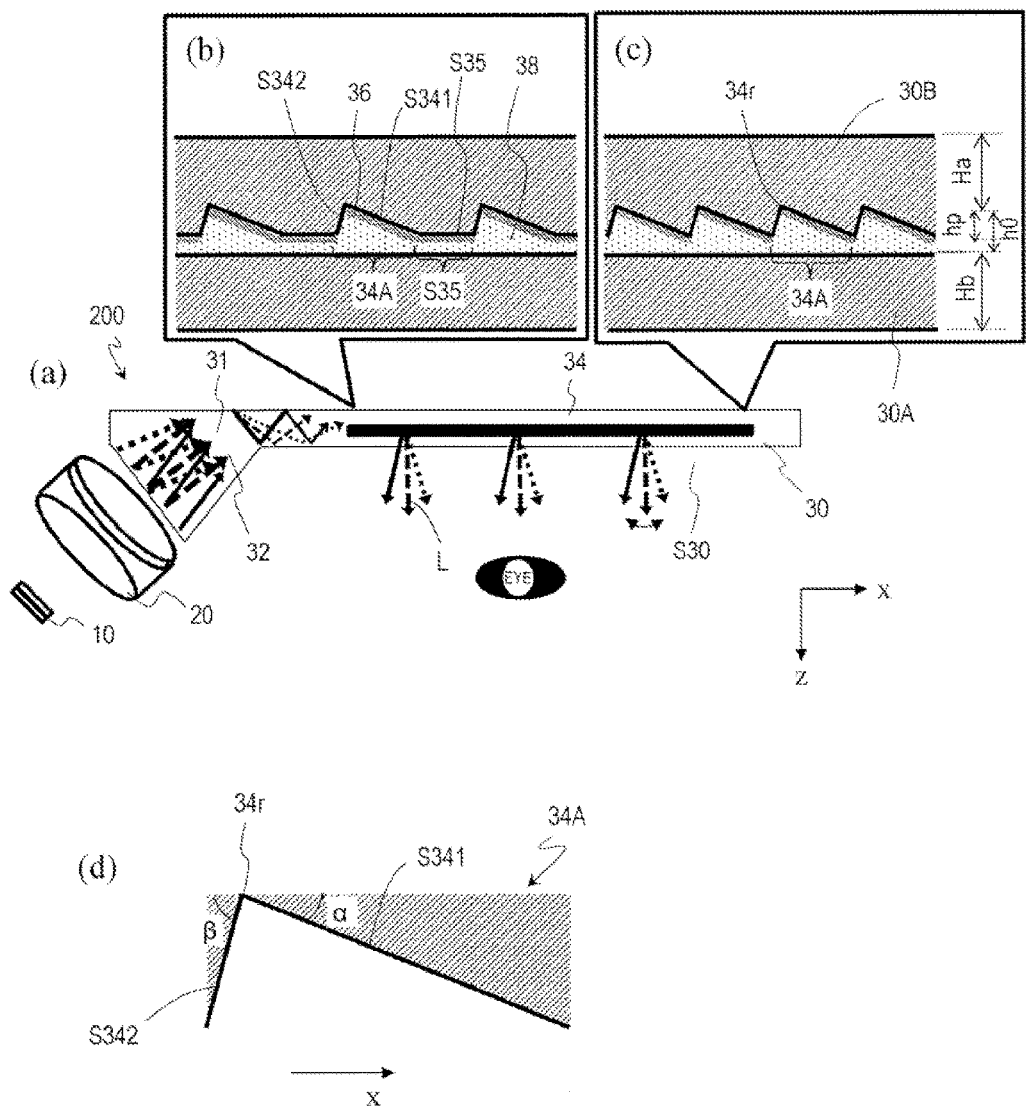
FIG. 12 schematically shows a virtual image display device in embodiment 2.
Figure 13:
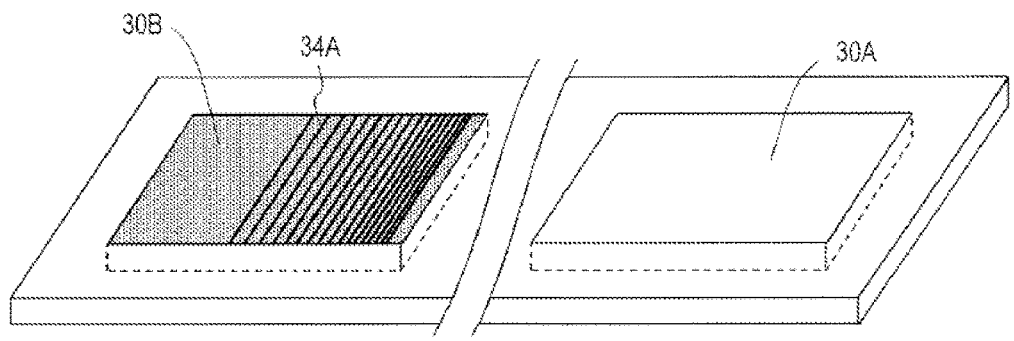
FIG. 13(a) shows a step for forming a transparent member of the virtual image display device in embodiment 2.
FIG. 13(b) is a cross-sectional view showing the degree of thermal expansion caused to each of transparent members.
Figure 13:
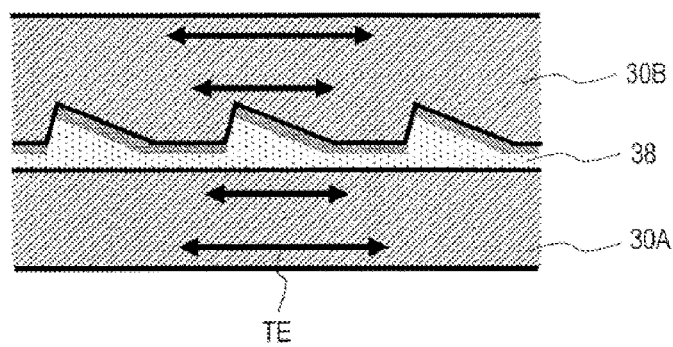

FIG. 13(a) shows that thermal press molding is performed on an acrylic plate to form the first transparent member 30A and the second transparent member 30B. As shown in the figure, a molding die, having a convexed structure corresponding to the concaved prisms shown in FIG. 12, is pressed into the acrylic plate used for forming the second transparent member 30B, so that the concaved prisms 34A shown in FIG. 12(d) are formed at the surface of the second transparent member 30B. More specifically, an acrylic cast plate having a thickness of 1 mm is subjected to thermal press molding to form the array of prisms and then is cut into a predetermined size (e.g. X=45 mm, Y=30 mm), so feat the second transparent member 30B is obtained. An acrylic cast plate having the same thickness, namely, a thickness of 1 mm, is cut into a predetermined size (e.g., X=45 mm, Y=30 mm), so that the fast transparent member 30A is obtained.

In this embodiment, where the second transparent member 30B, at which the prisms are formed, has a thickness Ha excluding the depth of the prisms and the flat first transparent member 30A facing the second transparent member 30B has a thickness Hb, the ratio of Ha and Hb may be set to, for example, 2:1 to 1:2. In this manner, the thickness of the first transparent member 30A and the thickness of the second transparent member 30B are set so as not to be significantly different from each other, so to the light guide plate is not easily warped or the numbers are not easily delaminated.

Alternatively, it is desirable that where the thickness made by the prisms formed at the second transparent member 30B and the third transparent member 38 on the prisms is h0, the sizes of the members are set to fulfill Ha−h0≤Hb≤Ha+h0. In this case, the thickness of the second transparent member 30B and the thickness of the first transparent member 30A are approximately the same as each other.

The first transparent member 30A and the second transparent member 30B are both formed of an acrylic cast plate, and therefore, have the same refractive index and the same coefficient of thermal expansion. Specifically, the refractive index of the acrylic resin is 1.492, and the coefficient of thermal expansion thereof is 70 ppm/° C. The first transparent member 30A and the second transparent member 30B have the same coefficient of thermal expansion and approximately the same thickness, and therefore, have an equivalent degree of thermal expansion as shown in FIG. 13(b). Thus, the light guide plate is prevented from being deformed, for example from being warped by a thermal load or the like.

The first transparent member 30A and the second transparent member 30B may be formed of a transparent resin material such as polycarbonate or the like instead of the acrylic resin. The first transparent member 30A and the second transparent member 30B are not limited to being formed of a cast plate and may be formed of an extruded plate or the like.

The semi-reflective film 36 may be formed of, for example, a $TiO_2$ film having a thickness of about 65 nm. The semi-reflective film 36 is not limited to being formed of the above film, and may be formed of another dielectric material or a metal material (Al, Ag, etc.). In this embodiment, like in embodiment 1, the semi-reflective film 36 may be formed by oblique vapor deposition so as to selectively cover the first inclining surface S341 of the concaved prism 34A and the parallel surface S35 but so as not to cover the second inclining surface S342.

The second transparent member 30B having the reflective prism array provided at the surface thereof as described above and the first transparent member 30A are bonded together, and the third transparent member 38 is provided between these members. The third transparent number 38 may be formed of a photocurable (ultraviolet-curable) resin, a thermosetting resin, a two-liquid epoxy resin or the like. In this embodiment, an ultraviolet-curable resin, more specifically, "UV-3000" produced by Daikin Industries, Ltd. is used. In this case, the third transparent member 38 has a refractive index of 1.498 and a coefficient of thermal expansion of 62 ppm/° C.

The third transparent member 38 is formed as follows, for example. A gap between the first transparent member 30A and the second transparent member 30B is filled with the above-described resin by pressurization, and then the resin is polymerized and cured. The coupling structure 32 may be formed separately and bonded to the first transparent member 30A.

In the case where an acrylic plate is used as the material of each of the first transparent member 30A and the second transparent member 30B and "UV-3000" is used as the material of the third transparent number 38 as described above, the reflective index of each of the first transparent member 30A and the second transparent member 30B and the refractive index of the third transparent member 38 are respectively 1.492 and 1.498, which may be considered to be approximately equivalent to each other. Therefore, the light is prevented from being reflected at the interface and thus the display quality is improved. In addition, the outside view is seen in a good manner. The coefficient of thermal expansion of the first and second transparent members 30A and 30B and the coefficient of thermal expansion of the third transparent member 38 are respectively 70 ppm/° C. and 62 ppm/° C., which are close to each other. Therefore, the thermal stress is not easily caused. In this specification, in the case where the difference in the coefficient of thermal expansion is 10% or less, the coefficients of thermal expansion are considered to be approximately the same.

With such a production method, the surface of the prisms 34A of the second transparent member 30B are flattened by the third transparent member 38 in a simple manner to produce the light guide plate including the reflective prism array 34. Therefore, a high productivity is guaranteed. In addition, the first transparent member 30A and the second transparent member 30B are secured to each other by the third transparent member 38 provided therebetween. Therefore, the adhesiveness is increased, and the light guide plate 30 is not easily cracked or warped.

An acrylic cast plate, because of the production method thereof, has a much smaller strain remaining inside than a plate produced by injection molding. Since the average thickness (Ha+hp/2) of the second transparent member 30B, at which the prisms 34A are provided, and the thickness Hb of the first transparent member 30A, approximately match each other. Therefore, the thermal stress caused to both of the members when a thermal load is applied may be adapted to each other (may be made symmetrical to each other). Therefore, the light guide plate 30 formed by bonding the first and second transparent members 30A and 30B is significantly suppressed from being warped or deformed by a thermal load or the like. Even in the case where an impact or a stress is applied to the surface of the light guide plate 30, cracking or delamination is prevented because the semi-reflective film 36 is not located in the vicinity of the surface of the light guide plate 30.

In the virtual image display device 200 in embodiment 2 also, like in embodiment 1, any of various optical members as described above with reference to FIG. 11(a) through FIG. 11(d) may be used as the coupling structure 32.

Embodiment 3

Figure 14:
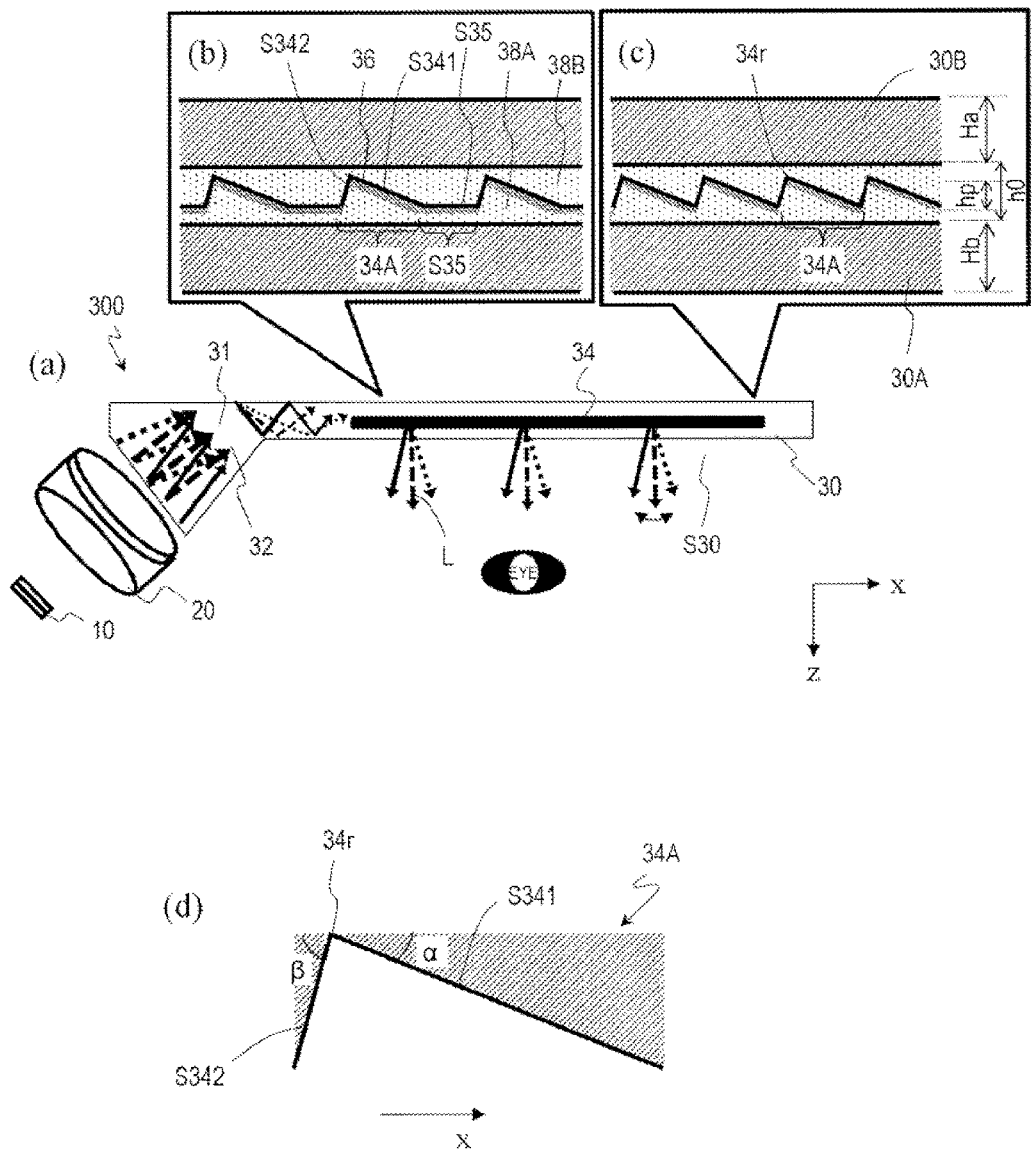
FIG. 14 schematically shows a virtual image display device in embodiment 3.
Figure 15:
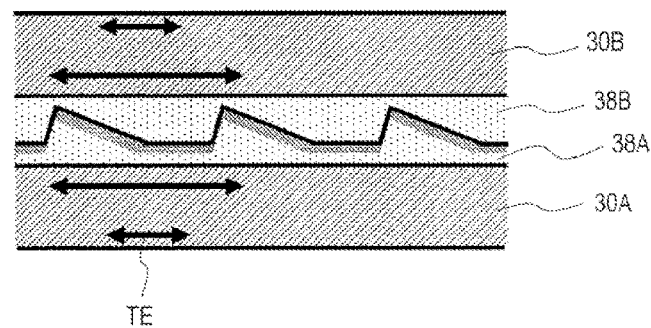
FIG. 15 is a cross-sectional view showing degree of thermal expansion caused to each of transparent members.

FIG. 14(a) is a cross-sectional view showing a virtual image display device 300 in embodiment 3. The virtual image display device 300 in this embodiment is different from the virtual image display device 200 in embodiment 2 on the following point. In the virtual image display device 300, as shown in FIG. 14(b) and FIG. 14(c), the reflective prism array 34 is formed by use of a fourth transparent member (transparent molded member) 38B provided on the second transparent member 30B by a 2p molding method (photo polymerization process), instead of the concaved prisms being directly formed at the surface of the second transparent member 30B.

In the virtual image display device 300, substantially the same components as those of the virtual image display device 100 or 200 in embodiment 1 or 2 will bear the same reference signs, and detailed descriptions thereof may be omitted.

The 2p molding method is performed as follows, for example. First, an ultraviolet-curable resin material is supplied to a stamper having a transfer pattern formed at a surface thereof. Then, a transparent substrate is pressed and adhered by pressure to the ultraviolet-curable resin material supplied to the stamper. Then, the ultraviolet-curable resin material is irradiated with ultraviolet rays through the transparent substrate to be cured, and a release process is performed. In this manner, the transparent substrate including a transparent resin layer having the transfer pattern transferred thereto is obtained.

The prism array formed by use of the fourth transparent member 38B on the second transparent member 30B may be a prism array formed of a plurality of concaved prisms 34A (see FIG. 14(d)) like in embodiment 2, in this embodiment also, the prism array may have an arrangement pattern in which the prisms 34A each include the first inclining surface S341 and the second inclining surface S342 and also include the parallel surface S35 having a larger width between the prisms in a region closer to the coupling structure 32.

Like in the other embodiments, the semi-reflective film 36 is provided on the prism array formed by use of the fourth transparent member 38B. Like in embodiment 2, semi-reflective film 36 is formed by oblique vapor deposition or the like so as to selectively cover the first inclining surface S341 of the prism 34A and the parallel surface S35. The semi-reflective film 36 is formed of, for example, a $TiO_2$ film having a thickness of about 65 nm. The semi-reflective film 36 is not limited to being formed of the above film, and may be formed of another dielectric material or a metal material (Al, Ag, etc,). In this embodiment also, like in embodiment 1, the semi-reflective film 36 may be formed by oblique vapor deposition so as to selectively cover the first inclining surfaces S341 of the concaved prisms and the parallel surfaces S35 but so as not to cover the second inclining surfaces S342.

In this embodiment, the first transparent member 30A and the second transparent member 30B are each formed of a glass substrate (refractive index: 1.52; coefficient of thermal expansion: 8.5 ppm/° C.). The fourth transparent member 38B is formed of an ultraviolet-curable resin "TB3078B" proceed by ThreeBond Holdings Co., Ltd (refractive index: 1.51; coefficient of thermal expansion: 75 to 135 ppm/° C.). Alternatively, the first transparent member 30A and the second transparent member 30B may each be formed of a transparent resin plate.

The second transparent member 30B is formed of a glass substrate having a thickness of 1 mm. The ultraviolet-curable resin "TB3078B" in contact with a transfer pattern on the second transparent member 30B is polymerized and cured to form a prism array by the 2p molding method, and the resultant member is cut into a predetermined size (e.g., X=45 mm; Y=30 mm). As a result, the second transparent member 30B having the prisms formed of the resin(fourth transparent member 38B) provided thereon is obtained. A glass plate having the same thickness, namely, a thickness of 1 mm, is cut into a predetermined size (e.g. X=45 mm, Y=30 mm), so that the first transparent number 30A is obtained.

The second transparent member 30B having the reflexive prism array 34, formed of the fourth transparent member 38B, provided thereon in this manner and the first transparent member 30A are bonded together; and a third transparent member 38A is provided therebetween. The third transparent member 38A may be formed of a photocurable (ultraviolet-curable) resin, a thermosetting resin, a two-liquid epoxy resin or the like. In this embodiment, the third transparent member 38A is formed of "TB3078B", which is the same ultraviolet-curable resin as used for the fourth transparent member 38B.

The third transparent member 38A is formed as follows. A gap between the first transparent member 30A and the fourth transparent member 38B is filled with the above-described resin by pressurization, and then is polymerized and cured. The coupling structure 32 may be formed separately and bonded to the first transparent member 30A.

In this embodiment, where the second transparent member 30B having the prisms provided thereon has a thickness Ha, and the flat first transparent member 30A facing the second transparent member 30B has a thickness Hb, the ratio of Ha and Hb may be set to, for example, 2:1 to 1:2. In this manner, the thickness of the first transparent member 30A and the thickness of the second transparent member 30B are set so as not to be significantly different from each other, so that the light guide plate is not easily warped or the members are not easily delaminated.

Alternatively, it is desirable that where the thickness made by the fourth transparent member 38B forming the prisms on the second transparent member 30B and the third transparent member 38A is h0, the sizes of the members are set to fulfill Ha−h0≤Hb≤Ha+h0. In this case, the thickness of the second transparent member 30B and the thickness of the first transparent member 30A are approximately the same as each other.

The first transparent member 30A and the second transparent member 30B are each formed of a glass plate. The glass plate has a very small strain remaining inside because of the material characteristics and the production method thereof. Therefore, the shape stability of the first transparent member 30A and the second transparent member 30B is improved. The thickness of the first transparent member 30A and the thickness of the second transparent member 30B may be made equal to each other, so that the thermal stress caused to both of the members when a thermal load is applied may be adapted to each other (may be made symmetrical to each other). The third transparent member 38A may be formed of the same material as that of the fourth transparent member 38B, so that the properties of the first transparent member 30A and the second transparent member 30B are matched to each other. Therefore, in the case where the first transparent member 30A and the second transparent member 30B are bonded together, the resultant assembly is effectively suppressed from being warped by a thermal load or the like. Light is prevented from being refracted at the interface, and the outside view is seen in a good manner.

With such a production method, the surface of the prisms 34A formed of the fourth transparent member 38B on the second transparent member 30B is flattened by the third transparent member 38A in a simple manner to produce the light guide plate 30 including the reflective prism array 34. Therefore, a high productivity is guaranteed. In addition, the first transparent member 30A and the second transparent member 30B are secured to each other by the third transparent member 38 provided therebetween. Therefore, the adhesiveness is increased, and the light guide plate 30 is not easily cracked or warped.

In the virtual image display device 300 to embodiment 3 also, like in embodiments 1 and 2, any of various optical members as described above with reference to FIG. 11(a) through FIG. 11(d) may be used as the coupling structure 32.

The virtual image display devices in embodiments 1 through 3 are described above. The virtual image display devices may be modified in any of various manners. For example, the light output surface S30 of the light guide plate 30 does not need to be a flat surface, and may be a concaved curved surface (spherical or aspherical).

This specification discloses the light guide plate and the virtual image display device described in the following items.

[Item 1]

A light guide plate, configured to allow light output from a display element to be propagated therein and to allow at least a part of the light propagated therein to be reflected by a plurality of reflective structures, the plurality of reflective structures each including a reflective surface inclining with respect to a light output surface, the light guide plate comprising:

a first transparent member;

a second transparent member; and a third transparent member provided between the first transparent member and the second transparent member;

wherein the plurality of reflective structures are provided at positions in contact with the third transparent member.

The light guide plate according to item 1 is not easily deformed, for example, is not easily warped, or does not cause a reflective film to be broken.

[Item 2]

The light guide plate according to item 1, wherein:

one main surface of two main surfaces of the third transparent number is formed so as to include a plurality of inclining surfaces inclining with respect to the light output surface, the plurality of inclining surfaces being fittable with reflective surfaces of the plurality of reflective structures; and the other main surface of the third transparent member is a flat surface parallel to the light output surface.

The light guide plate according to item 2 has a high production stability.

[Item 3]

The light guide plate according to item 1 or 2, whereto the first transparent member and the second transparent member are each formed of a glass plate or a transparent resin plate, and the third transparent member is formed of a curable resin material applied so as to be in contact with a surface of the first transparent member or the second transparent member.

The light guide plate according to item 3 has a surface having a relatively high strength and therefore, for example, is not easily broken.

[Item 4]

The light guide plate according to any one of items 1 through 3, wherein a flat portion of the first transparent member and a flat portion of the second transparent member have thicknesses having a ratio in a range of 2:1 to 1:2.

In the light guide plate according to item 4, the thickness of the first transparent member and the thickness of the second transparent member are not significantly different from each other. Therefore, even when a thermal load is caused, the light guide plate is not deformed, for example, is not warped, or the members are not delaminated.

[Item 5]

The light guide plate according to any one of items 1 through 4, wherein the first transparent member and the second transparent member have approximately the same coefficient of thermal expansion.

The light guide plate according to item 5 is not deformed, for example, is not warped, or the members are not delaminated, even when a thermal load is caused.

[Item 6]

The light guide plate according to any one of items 1 through 5, wherein the first transparent member and the third transparent member have approximately the same coefficient of thermal expansion.

The light guide plate according to item 6 is not deformed, for example, is not warped, or the members are not delaminated, even when a thermal load is caused.

[Item 7]

The light guide plate according to any one of items 1 through 6, wherein the first transparent member and the second transparent member are formed by injection molding, and the first transparent member and the second transparent member are located such that gate portions thereof are close to each other in the injection molding.

The light guide plate according to item 7 is not deformed, for example, is not warped, or the members are not delaminated, even when a thermal load is caused.

[Item 8]

The liquid crystal panel according to any one of items 1 through 7, wherein the reflective structures include a plurality of concaved or convexed prism structures provided at the first transparent member or the second transparent member, and the third transparent member is provided so its to cover the plurality of prism structures to flatten a surface of the plurality of prism structures.

The light guide plate according to item 8 allows virtual image display light to be displayed appropriately while being suppressed from being deformed or broken.

[Item 9]

The light guide plate according to item 8, wherein where one of the first transparent member and the second transparent member at which the plurality of prism structures are provided has a thickness Ha excluding the plurality of prism structures, the other of the first transparent member and the second transparent member has a thickness Hb, and a thickness made by the plurality of concaved or convexed prism structures and the third transparent member on the plurality of concaved or convexed prism structures is h0, Ha−h0≤Hb≤Ha+h0 is fulfilled.

The light guide plate according to item 9 is suppressed from being deformed or broken in a preferable manner.

[Item 10]

The light guide plate according to any one of items 1 through 7, wherein the plurality of reflective structures include a plurality of concaved or convexed prism structures provided at the third transparent member.

The light guide plate according to item 10 is appropriately produced by a 2P molding method or the like.

[Item 11]

The light guide plate according to item 10, wherein:

the third transparent member is in contact with the first transparent member; and the light guide plate further comprises a fourth transparent member provided between the third transparent member and the second transparent member, the fourth transparent member covering the plurality of prism structures to form a surface of the plurality of prism structures.

The light guide plate according to item 11 is appropriately produced by a 2P molding method or the like.

[Item 12]

A virtual image display device, comprising:

the light guide plate according to any one of items 1 through 11;

the display device; and a coupling structure secured to the light guide plate, the coupling structure receiving virtual image projection light output from the display device.

The virtual image display device according to item 12 displays an image formed by the display element stably as a virtual image.

[Item 13]

The virtual image display device according to item 12, wherein the virtual image display device is a see-through type virtual image display device configured such that the reflective surfaces of the plurality of reflective structures reflect a part of the light and transmit a part of the light.

The virtual image display device according to item 13 displays an image formed by the display element stably as a virtual image in a state of overlapping an outside view.

[Item 14]

The light guide plate according to my one of items 1 through 11, wherein the plurality of reflective structures are located so as to reflect light incident on the light guide plate via a light receiving portion and propagated in the light guide plate; mainly in a first direction; and the area size ratio of the inclining reflective surfaces per unit area size is varied in accordance with the distance from the light receiving portion in the first direction, as seen in a direction normal to the light output surface.

[Item 15]

The light guide plate according to item 14, wherein the area size ratio of the inclining reflective surfaces in a region having a short distance from the light receiving portion is smaller than the area size ratio of the inclining reflective surfaces in a region having a long distance from the light receiving portion.

[Item 16]

The light guide plate according to item 14 or 15, wherein the plurality of reflective structures each include a prism structure; the reflective surface is provided at a surface of the prism structure; the existence ratio of the prism structures per unit area size is increased as being farther from the light receiving portion in the first direction, as seen in the direction normal to the light output surface.

[Item 17]

The light guide plate according to item 16, wherein in an arrangement of the plurality of prism structures included in the plurality of reflective structures, a parallel surface approximately parallel to the light output surface is located between the prism structures adjacent to each other; and the parallel surface has a larger width at a first position closer to the light receiving portion and has a smaller width at a second position farther from the light receiving portion.

[Item 18]

The light guide plate according to item 17, wherein at a third position father from the light receiving portion than the second position is, the parallel surface is not provided between the prism structures adjacent to each other, and the prism structures adjacent to each other are in contact with each other.

INDUSTRIAL APPLICABILITY

The light guide plate according to the present invention is preferably usable for a virtual image display device such as an HMD, a HUD or the like.

REFERENCE SIGNS LIST

10 Display element
20 Projection lens system
30 Light guide plate
30A First transparent member
30B Second transparent member
31 Light receiving portion
32 Coupling structure
34 Prism reflective array
34A Prism
36 Half-reflective film
38,38A Third transparent member
38B Fourth transparent member
S1 Bottom main surface
S2 Top main surface
S30 Light output surface
S32 Light receiving surface
S341 First inclining surface
S342 Second inclining surface
S35 Parallel surface
100, 200, 300 Virtual image display device

The invention claimed is:

1. A light guide plate, configured to allow light output from a display element to be propagated therein and to allow at least a part of the light propagated therein to be reflected by a plurality of reflective structures, the plurality of reflective structures each including a reflective surface inclining with respect to a light output surface, the light guide plate comprising:

a first transparent member having the light output surface;

a second transparent member; and a third transparent member provided between the first transparent member and the second transparent member;

wherein the plurality of reflective structures are provided at positions in contact with the third transparent member;

one main surface of two main surfaces of the third transparent member is formed so as to include a plurality of inclining surfaces inclining with respect to the light output surface, the plurality of inclining surfaces being fitted with reflective surfaces of the plurality of reflective structures;

the other main surface of the third transparent member is a flat surface parallel to the light output surface;

the plurality of reflective structures include a plurality of concaved or convexed prism structures provided at the third transparent member;

the third transparent member is in contact with the first transparent member; and the light guide plate further comprises a fourth transparent member provided between the third transparent member and the second transparent member, the fourth transparent member covering the plurality of prism structures to form a surface of the plurality of prism structures.

2. The light guide plate according to claim 1, wherein the first transparent member and the second transparent member are each formed of a glass plate or a transparent resin plate, and the third transparent member is formed of a curable resin material applied so as to be in contact with a surface of the first transparent member or the second transparent member.

3. The light guide plate according to claim 1, wherein the first transparent member and the second transparent member are flat substrates; and the first transparent member and the second transparent member have thicknesses having a ratio in a range of 2:1 to 1:2.

4. The light guide plate according to claim 1, wherein the first transparent member and the second transparent member have substantially the same coefficient of thermal expansion.

5. The light guide plate according to claim 1, wherein the first transparent member and the third transparent member have substantially the same coefficient of thermal expansion.

6. A virtual image display device, comprising:
the light guide plate according to claim 1;
a display device; and
a coupling structure secured to the light guide plate, the coupling structure receiving virtual image projection light output from the display device.

7. The light guide plate according to claim 1, wherein the plurality of reflective structures are located so as to reflect light incident on the light guide plate via a light receiving portion and propagated in the light guide plate substantially in a first direction;
in the first direction, an arrangement pitch of the plurality of prism structures is a total of a width of each prism structure and a width of a parallel surface parallel to the light output surface, the parallel surface being a surface portion of the third transparent member on a side of the fourth transparent member; and
in accordance with a distance from the light receiving portion in the first direction, the width of the parallel surface is decreased while the width of each prism structure is kept the same, or the width of each prism structure is increased while the arrangement pitch of the plurality of prism structures is kept the same.

* * * * *